United States Patent
Aoki et al.

(10) Patent No.: US 8,514,950 B2
(45) Date of Patent: Aug. 20, 2013

(54) COMMUNICATION APPARATUS, RELAY METHOD THEREOF, AND COMPUTER-READABLE STORAGE MEDIUM

(75) Inventors: Norihito Aoki, Kawasaki (JP); Tetsuo Kanda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/141,750

(22) PCT Filed: Dec. 18, 2009

(86) PCT No.: PCT/JP2009/071714
§ 371 (c)(1),
(2), (4) Date: Jun. 23, 2011

(87) PCT Pub. No.: WO2010/074278
PCT Pub. Date: Jul. 1, 2010

(65) Prior Publication Data
US 2011/0317746 A1 Dec. 29, 2011

(30) Foreign Application Priority Data

Dec. 25, 2008 (JP) ................. 2008-331186
Oct. 21, 2009 (JP) ................. 2009-242785

(51) Int. Cl.
*H04B 14/04* (2006.01)
(52) U.S. Cl.
USPC ........... 375/242; 375/254; 375/260; 375/267; 375/296; 375/324; 375/340
(58) Field of Classification Search
USPC ................. 375/242, 254, 260, 296, 324, 340, 375/267
See application file for complete search history.

(56) References Cited

U.S. PATENT DOCUMENTS

2002/0055360 A1* 5/2002 Chen et al. ............ 455/452
2008/0288852 A1* 11/2008 Uehara et al. ......... 714/786

FOREIGN PATENT DOCUMENTS

| EP | 1843488 A1 | 10/2007 |
| EP | 1981179 A1 | 10/2008 |
| JP | 2006-054675 A | 2/2006 |
| WO | 2007/102344 A | 9/2007 |

OTHER PUBLICATIONS

Radhika Gowaikar, A Practical Scheme for Wireless Network Operation, IEEE Transactions on Communications (journal), Mar. 2007, pp. 463-476, vol. 55, No. 3, Publisher: IEEE Communications Society, New York, NY, USA.

Japanese Office Action issued in corresponding application No. 2008-331186 on Apr. 12, 2013.

* cited by examiner

*Primary Examiner* — Kabir A Timory
(74) *Attorney, Agent, or Firm* — Carter, DeLuca, Farrell & Schmidt LLP

(57) ABSTRACT

A communication apparatus may include a demodulation unit, a waveform memory unit, a decoding unit, an encoding unit, a modulation unit, and a transmission unit. The demodulation unit demodulates a received signal to create a demodulated signal. The waveform memory unit stores the demodulated signal and a waveform of the demodulated signal. The decoding unit decodes the demodulated signal to create a decoded signal. The encoding unit encodes the decoded signal to create an encoded signal. The modulation unit modulates one of the encoded signal to create a modulated encoded signal and the demodulated signal to create a modulated demodulated signal. The transmission unit transmit one of the modulated encoded signal and the modulated demodulated signal according to a reception state of the received signal.

12 Claims, 35 Drawing Sheets

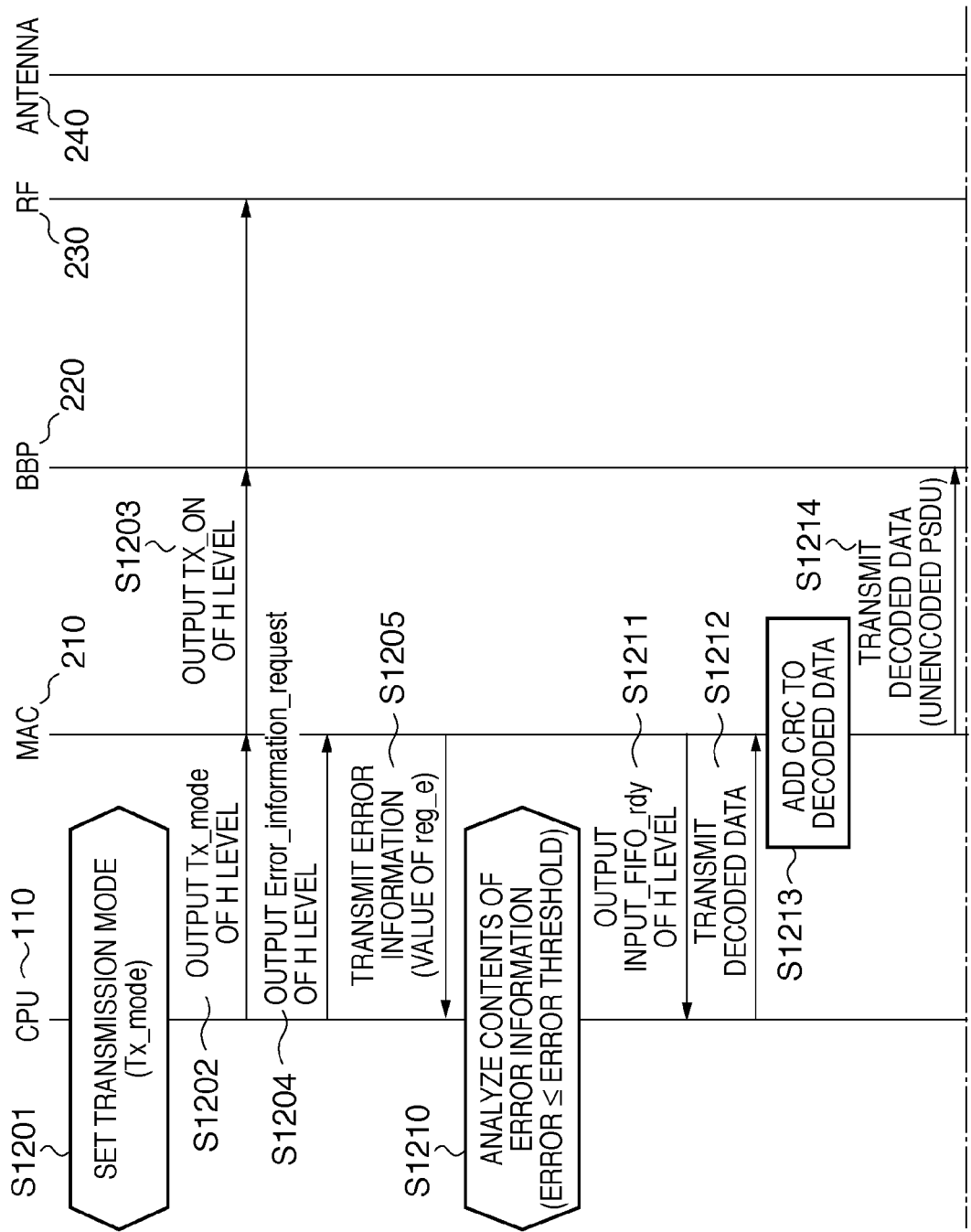

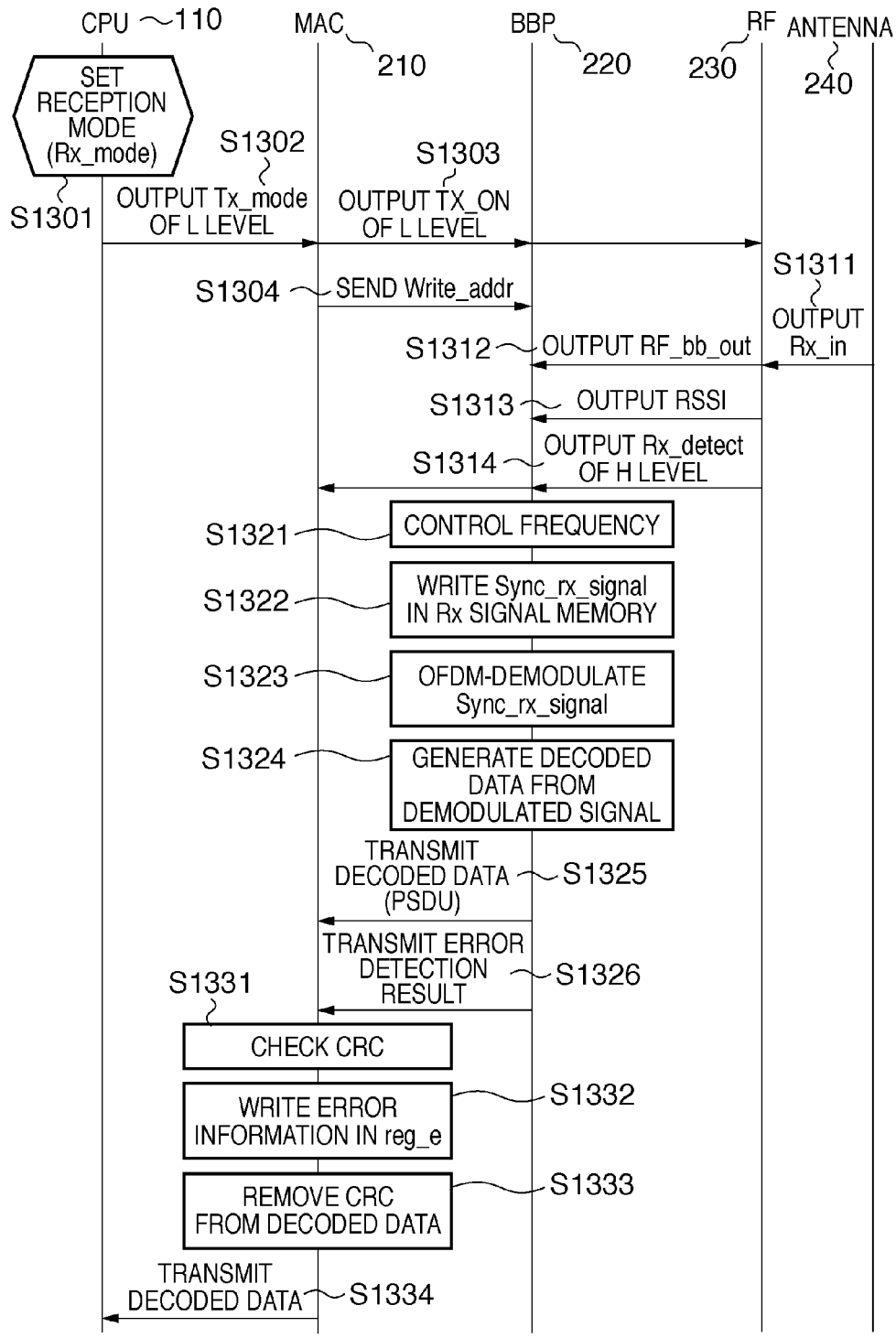

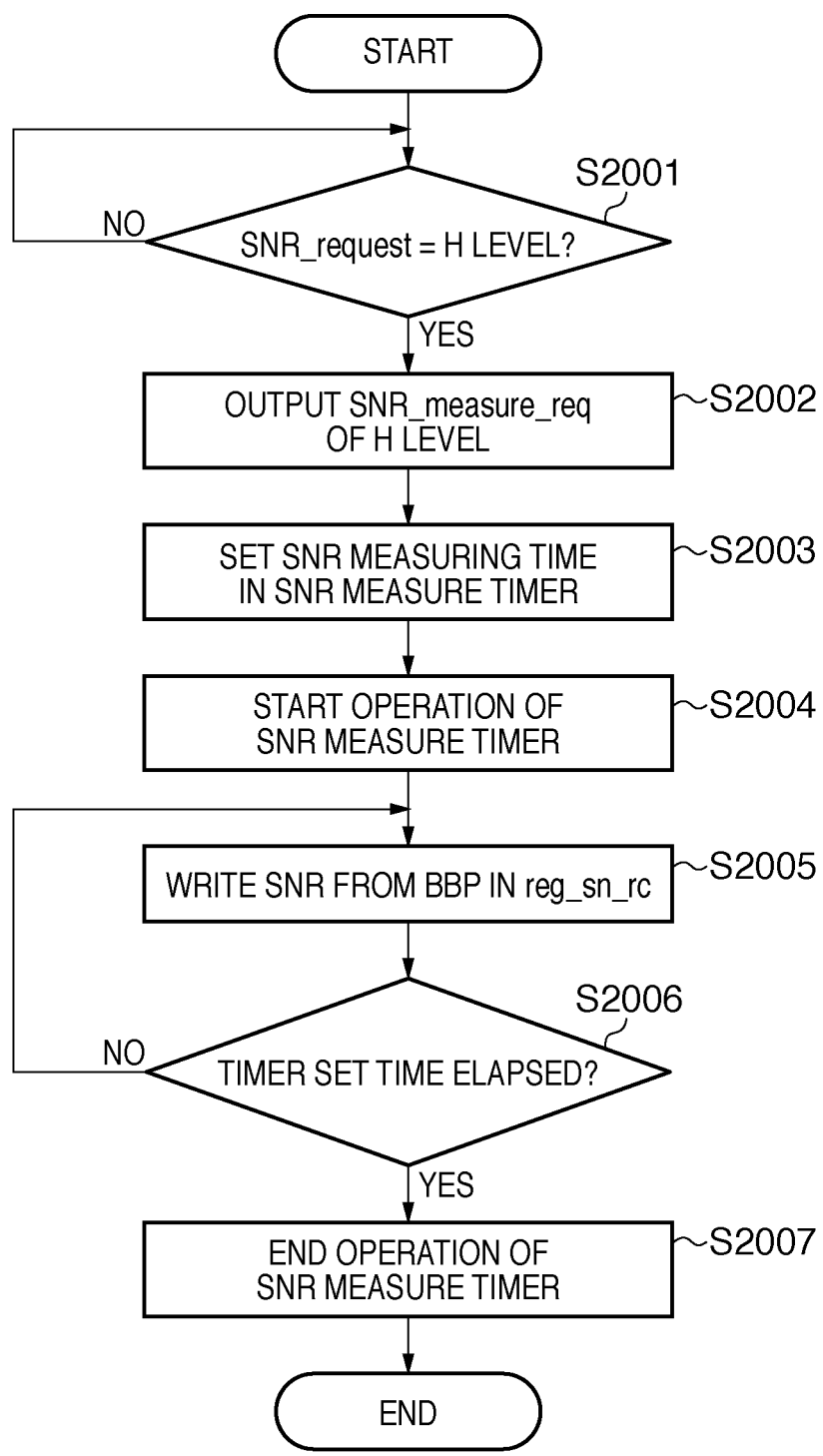

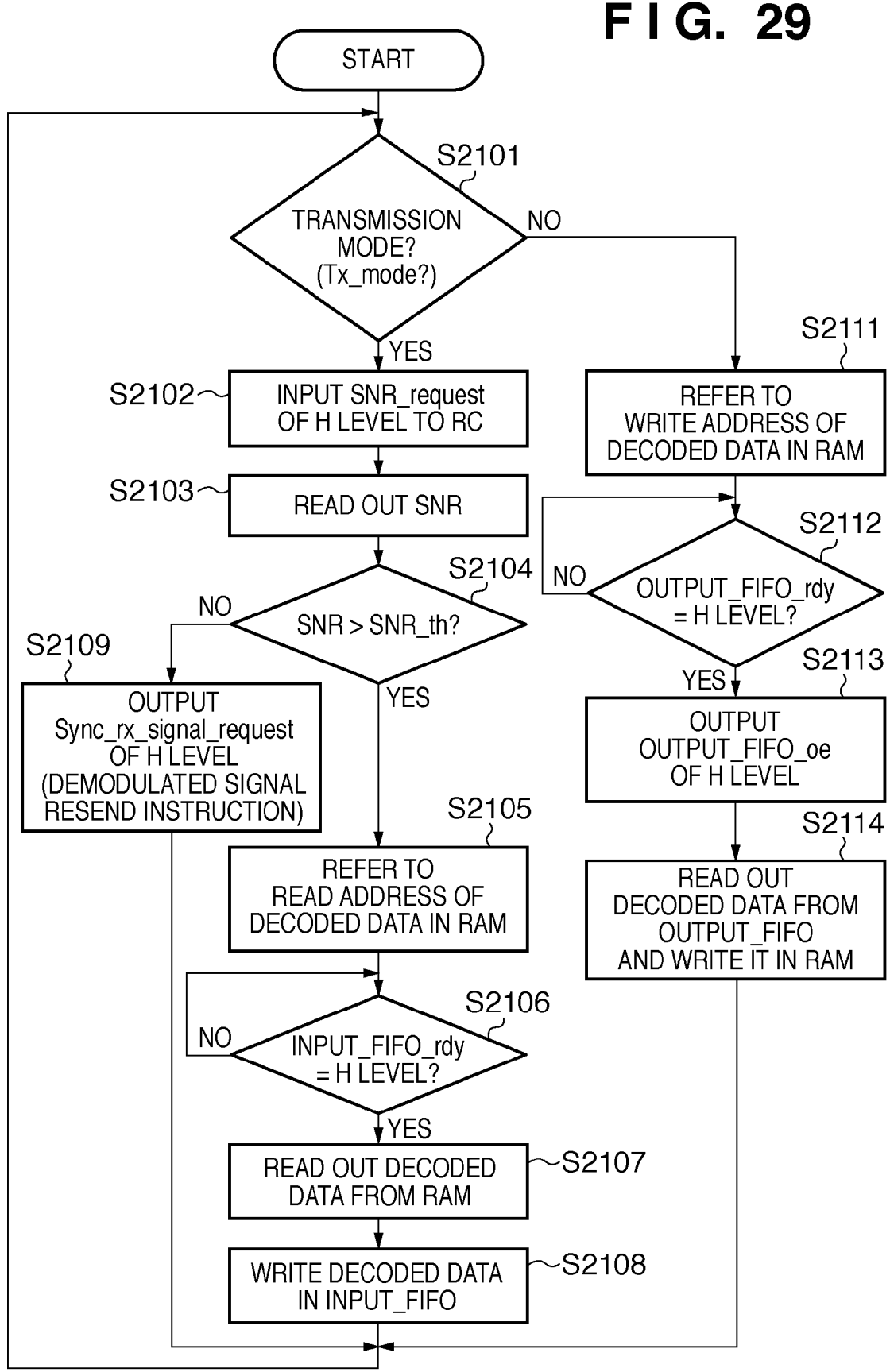

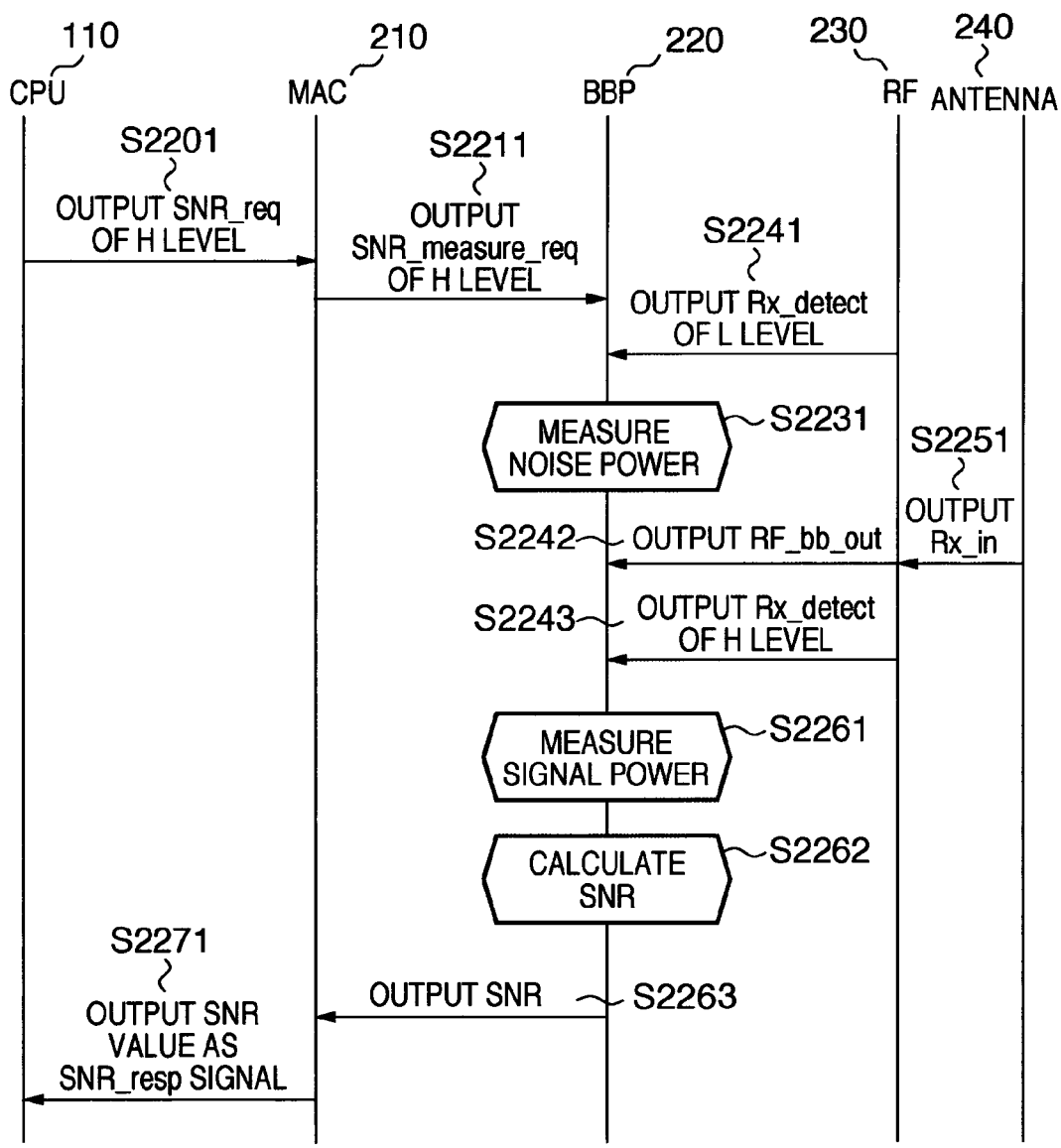

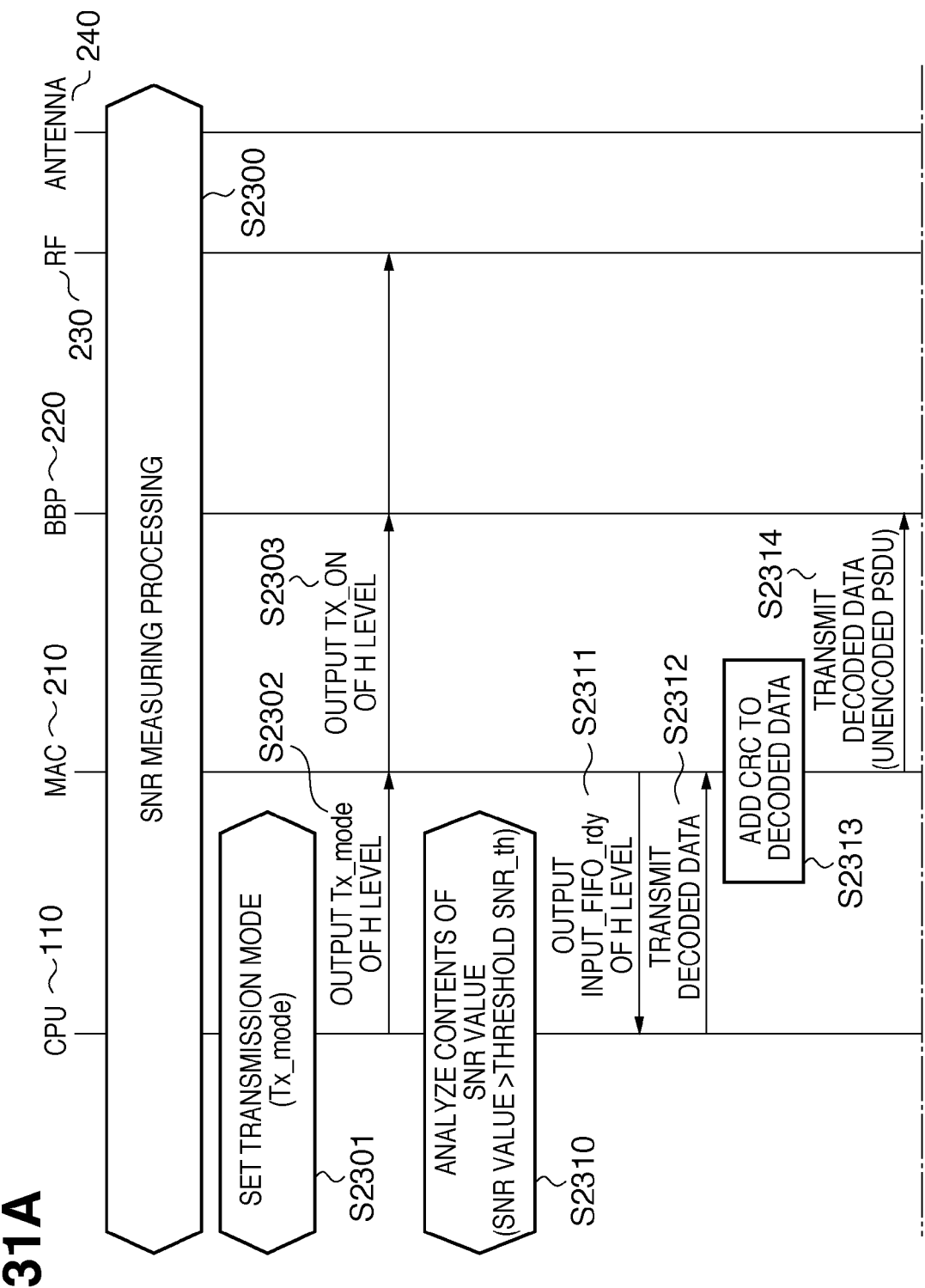

COMMUNICATION APPARATUS, RELAY METHOD THEREOF, AND COMPUTER-READABLE STORAGE MEDIUM

CROSS REFERENCE TO RELATED APPLICATIONS

This application is a National Stage filing of PCT application No. PCT/JP09/071714, filed Dec. 18, 2009, which claims priority from Japanese Patent Application No. 2009-242785, filed Oct. 21, 2009, and Japanese Patent Application No. 2008-331186, filed Dec. 25, 2008, all of which are hereby incorporated by reference herein in their entirety.

TECHNICAL FIELD

The present invention relates to a communication apparatus, a relay method thereof, and a computer-readable storage medium.

BACKGROUND ART

In general, a wireless communication system has flexibility without the restriction of cables. On the other hand, the probability of data error occurrence upon reception is high, and the reliability is lower than in wired communication. For example, in data reception, attenuation of a received signal (hereinafter also referred to as received data) makes the wireless signal extremely feeble and the signal to noise ratio (SN ratio) low. For this reason, demodulation errors occur at high probability. In addition, since the radio wave reflected by various objects reaches the destination node while being delayed from the direct wave, the destination node receives the plurality of radio waves having different delay times and strengths. This sometimes causes a signal distortion in the received data, resulting in data errors. That is, when a signal having a low SN ratio and containing a distortion is demodulated on the destination node side, data errors occur at high probability. To prevent this, data protection is done in some cases using, for example, an error correction code.

If the distance between the source node and the destination node is long to some extent, it is impossible to ensure the necessary SN ratio on the destination node side, and a relay apparatus needs to be provided between the source node and the destination node (Japanese Patent Laid-Open No. 2006-54675). The relay apparatus receives data (wireless signal) transmitted from the source node and demodulates and decodes the data using an error correction code. The relay apparatus then re-encodes and re-modulates the data and transmits the re-modulated data to the destination node. Since the relay apparatus eliminates the influence of noise and distortion, it is possible to relay-transmit, to the destination node side, data having almost the same quality as that of the original data transmitted from the source node.

Redundancy transmission by diversity is known as a technique of improving the reliability of wireless communication. In the redundancy transmission technique, a plurality of communication paths from a source node to a destination node are provided. Data identical to that transmitted from the source node are transmitted to the destination node using the plurality of different communication paths.

When a plurality of communication paths (to also be referred to as transmission paths hereinafter) are used, even in case of communication breakdown in one of the communication paths, data transmission/reception can be done via the remaining communication paths, and the communication quality from the source node to the destination node can be maintained. Hence, use of redundancy transmission prevents loss of transmission data caused by breakdown of a communication path and also obviates resend control processing for recovering data loss.

For this reason, redundancy transmission is often used in, for example, a system which requires very high reliability or a synchronous data transfer system which prohibits use of resend processing. In redundancy transmission, the destination node side receives a plurality of data via the plurality of communication paths and then combines and decodes them. Hence, a diversity effect can be attained.

There is also known a technique of transmitting data without performing the above-described decoding/re-encoding (A Practical Scheme for Wireless Network Operation, IEEE Trans. on Comm., VOL. 55, NO. 3, March 2007). In this technique, when transmitting data from a source node to a destination node, a relay apparatus transmits received data to the next communication node without decoding/re-encoding the data. This increases both the communication capacity and the channel capacity.

Even when data protection using an error correction code is performed to reduce data errors, the relay apparatus cannot correct all errors if the received data contains errors in number beyond the correction capability of the error correction code. In this case, the data containing the errors is relay-transmitted to the destination node side.

The principle of data error occurrence in wireless communication will be explained here with reference to FIG. 32A. FIG. 32A shows an outline of a modulated signal in BPSK (Binary Phase Shift Keying).

In the BPSK, phase modulation is executed such that, for example, when a data symbol to be modulated is "0", the phase of the carrier signal becomes 0° (point A), and when the data symbol is "1", the phase of the carrier signal becomes 180° (point B). A destination node maps the modulation point of a received BPSK signal on the in-phase axis, and acquires the position on the in-phase axis as a metric value. If the metric value is positive, the received data symbol is acquired as "0". If the metric value is negative, the received data symbol is acquired as "1".

A BPSK modulated signal which has just been modulated in a source node rarely contains noise components. Hence, in this modulated signal, the metric values of data symbols "0" and "1" are almost +1.0 and −1.0, respectively. However, a wireless signal that has passed through a communication path contains superimposed noise or distortion. In this case, metric values generated in the destination node (or relay apparatus) have a Gaussian distribution as shown in FIG. 32A because of the influence of noise. If the noise components contained in the received data (received signal) are large, the distribution extends widely. For example, if the distribution in the region where the sign of the metric value is positive extends into the negative region beyond the metric value of 0, the destination node erroneously determines a data symbol "0" as "1". A reverse phenomenon also occurs. This failure generates data errors in the destination node.

An outline of redundancy transmission using three communication paths will be described next with reference to FIG. 32B. Note that the numerical values in FIG. 32B indicate metric values at given points. Since the influence of noise and distortion in a communication path varies over time, each metric value in FIG. 32B represents an instantaneous value of a transmission bit of interest.

The transmission data bit is "0", a source node 50 modulates and transmits the bit "0" as a metric value of +1.0. The signal transmitted from the source node 50 suffers the influence of attenuation and distortion on a communication path. Hence, each relay apparatus receives a signal whose metric value has varied from +1.0 upon transmission. For example, a relay apparatus 51 receives a signal having a metric value of +0.4. A relay apparatus 52 receives a signal having a metric value of +0.5. A relay apparatus 53 receives a signal having a metric value of −0.1. The relay apparatuses 51 and 52 decode the signals into the normal value (bit "0") and then modulate and relay-transmit them because the metric values are positive. However, the relay apparatus 53 which has received the metric value of −0.1 relay-transmits the data bit as the wrong metric value of −0.1.

As in the communication path from the source node to each relay apparatus, the wireless signal is affected by noise and distortion even in the communication path from each relay apparatus to the destination node. A destination node 54 receives metric values of +0.3, +0.4, and −1.1 as the received data from the relay apparatuses, and combines and decodes them. Assume that the destination node 54 executes combination decoding by adding the metric values (the three metric values are added to generate a combined metric value). In this case, the combined metric value is −0.4, that is, negative. For this reason, the destination node 54 determines the combined received data symbol erroneously as "1".

As described above, if the relay apparatus re-encodes data containing errors, the data containing superimposed errors is relay-transmitted. As a consequence, data errors occur in the destination node even after combination decoding, and no sufficient diversity effect by combination decoding can be obtained.

DISCLOSURE OF INVENTION

The present invention provides a technique of lowering the error occurrence probability in relay data.

According to a first aspect of the present invention, there is provided a communication apparatus characterized by comprising: demodulation means for demodulating a received signal to generate a demodulated signal; decoding means for decoding the demodulated signal to generate decoded data; encoding means for encoding the decoded data to generate an encoded signal; re-modulation means for modulating, based on a reception state of the received signal, one of the signal encoded by the encoding means and the signal demodulated by the demodulation means to generate a re-modulated signal; and transmission means for transmitting the signal re-modulated by the re-modulation means.

According to a second aspect of the present invention, there is provided a relay method of a communication apparatus, characterized by comprising: the demodulation step of demodulating a received signal to generate a demodulated signal; the decoding step of decoding the demodulated signal to generate decoded data; the encoding step of encoding the decoded data to generate an encoded signal; the re-modulation step of modulating, based on a reception state of the received signal, one of the signal encoded in the encoding step and the signal demodulated in the demodulation step to generate a re-modulated signal; and the transmission step of transmitting the signal re-modulated in the re-modulation step.

Further features of the present invention will be apparent from the following description of exemplary embodiments with reference to the attached drawings.

BRIEF DESCRIPTION OF DRAWINGS

FIGS. 22A and 22B are a sequence chart showing an example of the chart of a message sequence upon transmission by a communication apparatus 100 shown in FIG. 10;

FIG. 23 is a sequence chart showing an example of the chart of a message sequence upon reception by the communication apparatus 100 shown in FIG. 10;

FIG. 28 is a flowchart illustrating an example of the operation of an RC 7000 according to the fifth embodiment;

FIG. 29 is a flowchart illustrating an example of the operation of a CPU 110 according to the fifth embodiment;

FIG. 30 is a sequence chart showing an example of the chart of a message sequence upon SNR measurement by a communication apparatus 100 according to the fifth embodiment;

FIGS. 31A and 31B are a sequence chart showing an example of the chart of a message sequence upon transmission by the communication apparatus 100 according to the fifth embodiment.

BEST MODE FOR CARRYING OUT THE INVENTION

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
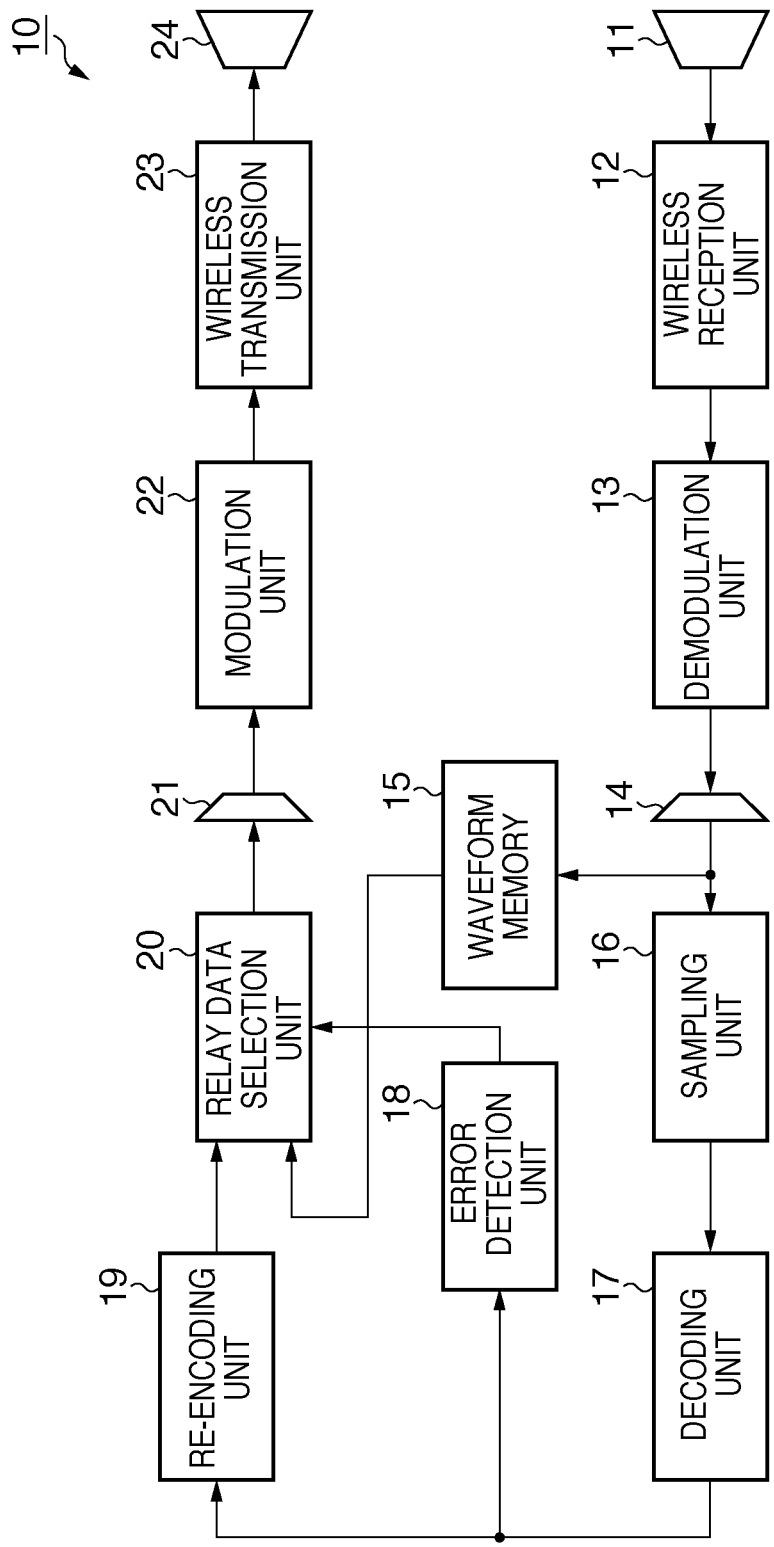
FIG. 1 is a block diagram showing an example of the arrangement of a relay apparatus according to an embodiment of the present invention.

FIG. 1 is a block diagram showing an example of the arrangement of a relay apparatus according to an embodiment of the present invention.

A relay apparatus 10 includes, as components associated with reception processing, a receiving antenna 11, wireless reception unit 12, demodulation unit 13, analog to digital converter (A/D converter) 14, waveform memory 15, sampling unit 16, decoding unit 17, and error detection unit 18. The relay apparatus 10 also includes, as components associated with relay transmission, a re-encoding unit 19, relay data selection unit 20, digital to analog converter (D/A converter) 21, modulation unit 22, wireless transmission unit 23, and transmission antenna 24.

The components associated with reception processing will be described first. The receiving antenna 11 receives a wireless signal transmitted from a source node as received data. The wireless reception unit 12 converts the wireless signal received by the receiving antenna 11 from a high frequency band signal to an intermediate frequency band signal. The wireless reception unit 12 includes an automatic gain control circuit which further adjusts the converted signal to an appropriate signal level.

The demodulation unit 13 demodulates the intermediate frequency signal adjusted to an appropriate level by the wireless reception unit 12. More specifically, the demodulation unit 13 demodulates the signal to an analog reception baseband signal of in-phase channel (I channel) and quadrature channel (Q channel).

The A/D converter 14 converts the baseband signal into digital data (received digital signal). The received digital data is stored in the waveform memory 15 and also sent to the sampling unit 16. The received digital data stored in the waveform memory 15 holds the metric value of each data bit on the time base.

The sampling unit 16 extracts a data bit string from the received digital data in accordance with a data clock. The extracted data bit string is sent to the decoding unit 17. The decoding unit 17 decodes the data bit string using an error correction code, thereby generating decoded data. Note that the error correction can be done by adopting various kinds of error correction codes such as a convolution code, (RS) code, and low-density parity-check code (LDPC), and any arbitrary method is usable. The decoded data includes not only the error correction code but also a checksum which is added in advance for error detection upon transmission from the source node.

The error detection unit 18 verifies the checksum added to the decoded data and detects whether the decoded data contains an uncorrected error bit. As the checksum, a CRC (Cyclic Redundancy Check) code or the like is used. Note that the checksum has no capability of correcting individual error data but is capable of detecting whether the entire data packet contains error data. For this reason, even when the decoding unit 17 cannot completely correct data errors, and the decoded data still contains uncorrected errors, the error detection unit 18 can detect the data errors.

The components associated with relay transmission will be described next. The re-encoding unit 19 executes error correction coding using the same scheme as that of the source node (transmission apparatus), thereby encoding the decoded data again.

Based on a control signal (error detection result) from the error detection unit 18, the relay data selection unit 20 selects one of the re-encoded data generated by the re-encoding unit 19 and the received digital data stored in the waveform memory 15. The selected data is output to the D/A converter 21 as transmission digital data. For example, when the error detection unit 18 has determined that the decoded data contains no uncorrected error bits, the relay data selection unit 20 selects the re-encoded data and outputs it to the D/A converter 21. On the other hand, when the error detection unit 18 has determined that the decoded data contains uncorrected error bits, the relay data selection unit 20 selects the received digital data that is received data before error correction processing and outputs it to the D/A converter 21. As described above, the received digital data holds the metric value received by the relay apparatus 10.

The D/A converter 21 converts the transmission digital data into an analog transmission baseband signal. The modulation unit 22 modulates the analog transmission baseband signal to an intermediate frequency band signal, thereby generating re-modulated data. The wireless transmission unit 23 converts the intermediate frequency band signal into a high frequency band signal. The transmission antenna 24 transmits the wireless signal to the destination node (reception apparatus) as relay data.

Figure 2:
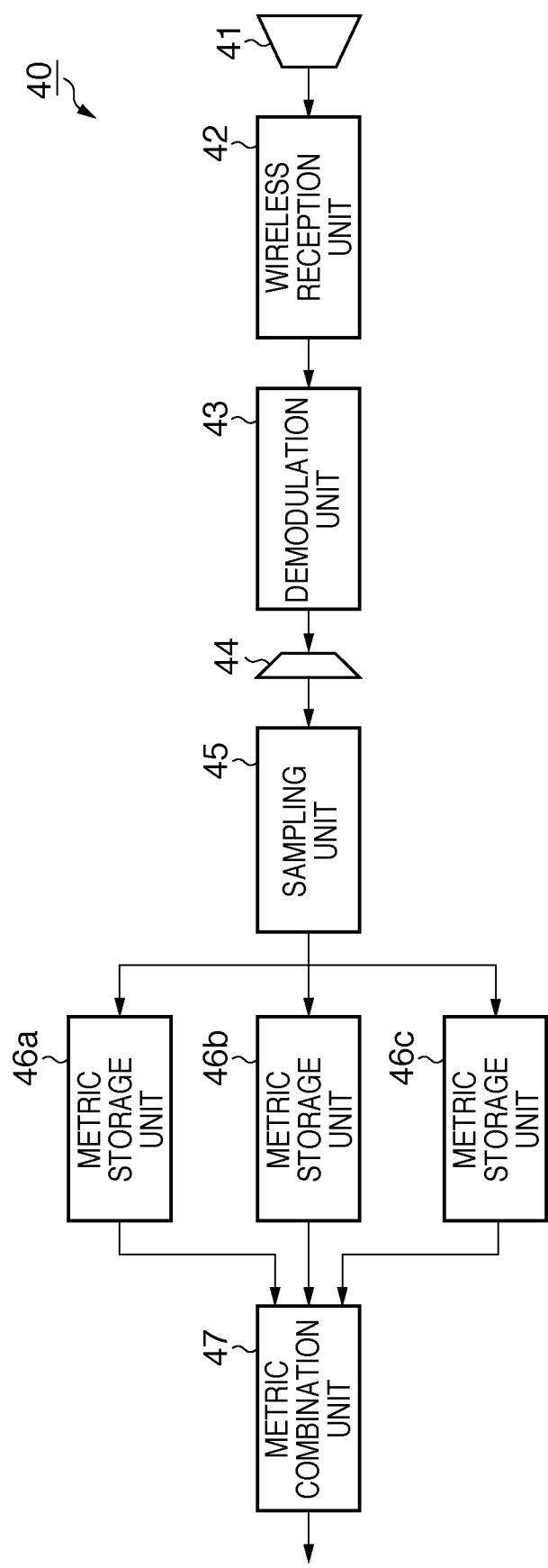
FIG. 2 is a block diagram showing an example of the arrangement of a destination node 40 according to the embodiment.

An example of the arrangement of a destination node 40 according to this embodiment will be described next with reference to FIG. 2.

The destination node 40 includes a receiving antenna 41, wireless reception unit 42, demodulation unit 43, A/D converter 44, sampling unit 45, a plurality of metric storage units 46, that is, 46a to 46c, and metric combination unit 47. Note that the components other than the metric storage units 46 and the metric combination unit 47 have the same functions as those of the corresponding components of the relay apparatus 10 described with reference to FIG. 1, and a description thereof will sometimes be omitted. More specifically, the receiving antenna 41 corresponds to the receiving antenna 11. The wireless reception unit 42 corresponds to the wireless reception unit 12. The demodulation unit 43 corresponds to the demodulation unit 13. The A/D converter 44 corresponds to the A/D converter 14. The sampling unit 45 corresponds to the sampling unit 16.

Each of the metric storage units 46 stores a metric value extracted by the sampling unit 45 in accordance with a data clock. The metric storage units 46 store metric values sent via a plurality of communication paths (different relay apparatuses 10). Note that in this example, the three metric storage units 46a to 46c are provided to store received metric values sent from three relay apparatuses 10, respectively.

The metric combination unit 47 combines and decodes the data received via the plurality of communication paths. That is, the metric combination unit 47 combines the metric values of data bits. The metric combination unit 47 according to this embodiment will be exemplified as a unit configured to combine and decode data sent from three communication paths. Hence, the three metric storage units 46a to 46c are provided.

Examples of the arrangements of the relay apparatus 10 and the destination node 40 have been described above with reference to FIGS. 1 and 2. Note that each of the relay apparatus 10 and the destination node 40 incorporates a computer. The computer includes a main control means such as a CPU and storage means such as a ROM (Read Only Memory), RAM (Random Access Memory), and HDD (Hard Disk Drive). The computer also includes input and output means such as a keyboard, mouse, display, buttons, and touch panel. These constituent elements are connected by a bus and the like and controlled by causing the main control means to execute programs stored in the storage means.

Figure 3:
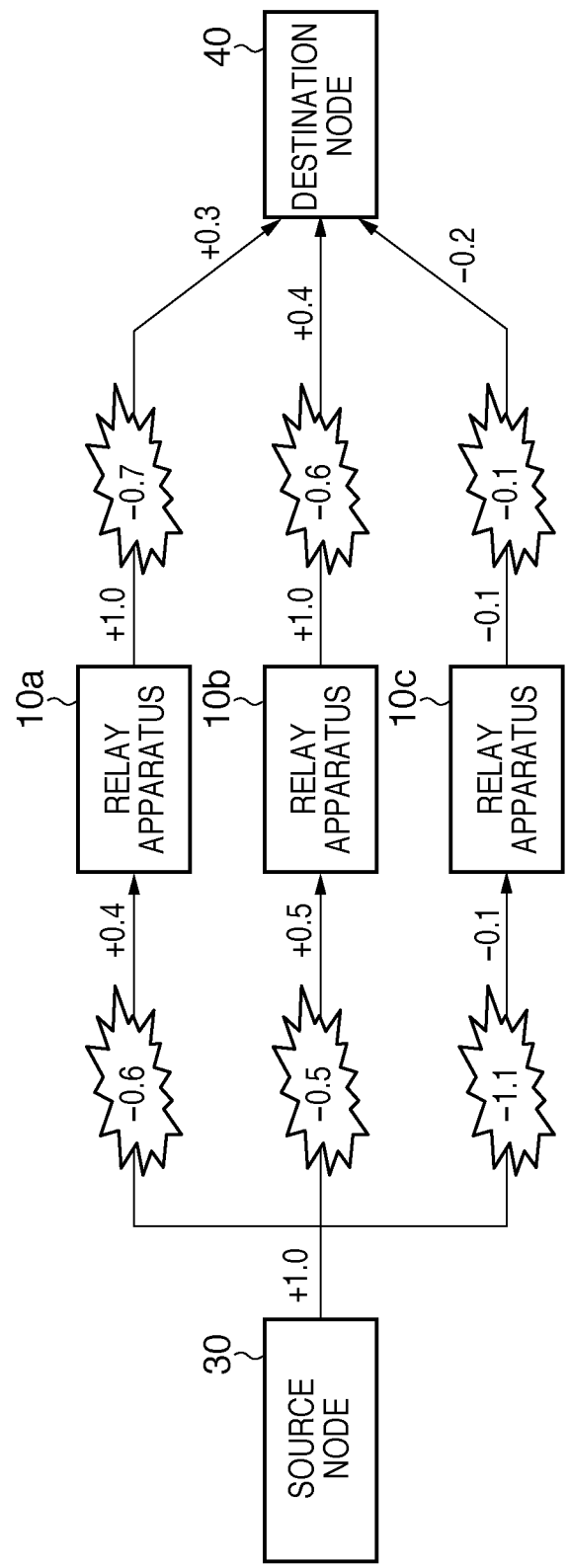
FIG. 3 is a view showing an outline of relay transmission.

An example of relay transmission will be explained next with reference to FIG. 3. A case will be explained in which a communication system including three relay apparatuses 10 described with reference to FIG. 1 performs relay transmission by redundancy transmission.

Data transmitted from a source node 30 is relay-transmitted by the relay apparatuses (first relay apparatus 10a, second relay apparatus 10b, and third relay apparatus 10c) and finally combined and decoded in the destination node 40. FIG. 3 shows metric values at given points and the magnitude of influence of, for example, noise and distortion in each communication path. These values are instantaneous values of a transmission bit of interest.

The first relay apparatus 10a and the second relay apparatus 10b receive received data (wireless signals) sent from the source node 30, accurately decode them, and relay data without errors. To the contrary, in the third relay apparatus 10c, decoded data contains uncorrected error bits. More specifically, data received by the third relay apparatus 10c contains errors in number beyond the correction capability of an error correction code.

In this case, the first and second relay apparatuses 10 relay-transmit re-encoded data. More specifically, the relay data selection unit 20 selects re-encoded data generated by the re-encoding unit 19 and relay-transmits the data. On the other hand, the third relay apparatus 10c directly relay-transmits the received data because decoded data contains error bits. More specifically, the relay data selection unit 20 selects data stored in the waveform memory 15 and relay-transmits the data.

Upon receiving data (wireless signal) sent from the first relay apparatus 10a, the destination node 40 stores the metric value of each data bit contained in the received data in the metric storage unit 46a. Similarly, the metric value of each data bit contained in data received from the second relay apparatus 10b is stored in the metric storage unit 46b. The metric value of each data bit contained in data received from the third relay apparatus 10c is stored in the metric storage unit 46c.

When reception of all data from the three relay apparatuses 10 has ended, the destination node 40 causes the metric combination unit 47 to execute combination decoding. The first relay apparatus 10a and the second relay apparatus 10b normally decode a data symbol "0" transmitted from the source node 30 as a metric value of +1.0. Hence, the two relay apparatuses relay-transmit the metric value of +1.0. However, the third relay apparatus 10c directly relay-transmits demodulated data. That is, the third relay apparatus 10c relay-transmits the same metric value of −0.1 as that received from the source node 30.

The data relay-transmitted by each relay apparatus 10 suffers the influence of noise and distortion on the communication path to the destination node 40. As a result, the destination node 40 receives the data from the first to third relay apparatuses 10 as metric values of +0.3, +0.4, and −0.2, respectively.

The destination node 40 performs combination decoding by adding the metric values. That is, the three metric values are added to calculate a combined metric value of +0.5. Since the calculated metric value is positive, the destination node 40 receives the combined received data symbol as "0". That is, the destination node 40 can normally receive the same value as that of the data symbol transmitted from the source node 30.

Figure 4:
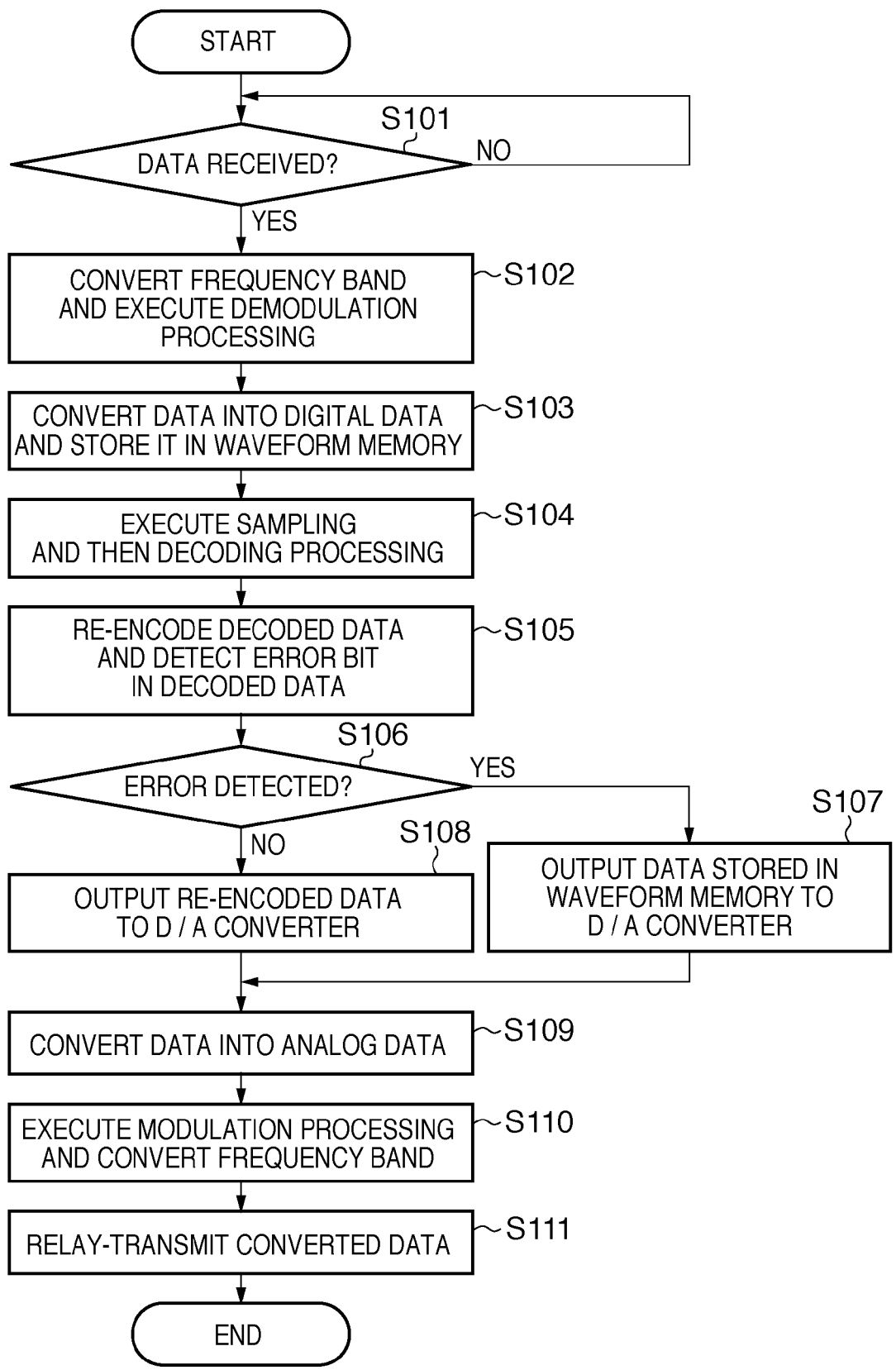
FIG. 4 is a flowchart illustrating an example of the operation of a relay apparatus 10 shown in FIG. 1.

An example of the operation of the relay apparatus 10 shown in FIG. 1 will be described next with reference to FIG. 4. An operation of performing relay transmission will be exemplified here.

When the receiving antenna 11 of the relay apparatus 10 receives data (wireless signal), the processing starts (YES in step S101). When the processing has started, the relay apparatus 10 causes the wireless reception unit 12 to convert the frequency band of the received data and causes the demodulation unit 13 to demodulate the converted data to an analog reception baseband signal (S102).

Subsequently, the relay apparatus 10 causes the A/D converter 14 to convert the baseband signal into received digital data. The received digital data is output to the sampling unit 16 and stored in the waveform memory 15 (S103).

The relay apparatus 10 causes the sampling unit 16 to perform sampling and causes the decoding unit 17 to decode the sampled data bit string using an error correction code (S104). As described above, a checksum for detection has been added to the decoded data.

The relay apparatus 10 causes the error detection unit 18 to verify the checksum and detect whether the decoded data contains an uncorrected error bit. The relay apparatus 10 also causes the re-encoding unit 19 to re-encode the decoded data to generate re-encoded data (S105). Upon determining based on the error detection result from the error detection unit 18 that the decoded data contains no uncorrected error bit (NO in step S106), the relay apparatus 10 causes the relay data selection unit 20 to select the re-encoded data and output it to the D/A converter 21 (S108). On the other hand, if the decoded data contains an uncorrected error bit (YES in step S106), the relay apparatus 10 causes the relay data selection unit 20 to select the data stored in the waveform memory 15 and output it to the D/A converter (S107). That is, when the decoded data contains an uncorrected error bit, the data before the error correction processing is output to the D/A converter 21.

After that, the relay apparatus 10 causes the D/A converter 21 to execute D/A conversion to convert the digital data into an analog transmission baseband signal (S109). The modulation unit 22 modulates the baseband signal to an intermediate frequency band signal. The wireless transmission unit 23 converts the intermediate frequency band signal into a high frequency band signal (S110). The relay apparatus 10 then transmits the converted data (wireless signal) from the transmission antenna 24 to the destination node 40 (S111).

As described above, according to the first embodiment, when relaying data containing errors in number beyond the correction capability of the error correction code, not the decoded data after error correction processing but the data before error correction processing is directly relay-transmitted.

Conventionally, there is no arrangement for detecting whether decoded data after error correction processing contains uncorrected errors and selectively relay-transmitting data based on the detection result. Hence, data errors may occur on the destination node side as a consequence of superimposition of errors. According to the embodiment, it is possible to reduce data errors generated by such a situation.

Second Embodiment

The second embodiment will be described next. In the first embodiment, relay data is switched based on whether data contains uncorrected error bits. In the second embodiment, however, a case will be explained in which the signal to noise ratio (SN ratio) of received data (received signal) is estimated, and relay data is switched based on the estimated value. Note that when the SN ratio of a received signal becomes low, the demodulation metric distribution in the destination node extends, and bit errors occur at higher probability. That is, the probability that received data contains error bits or the number of generated error bits can be estimated based on the SN ratio of received data.

Figure 5:
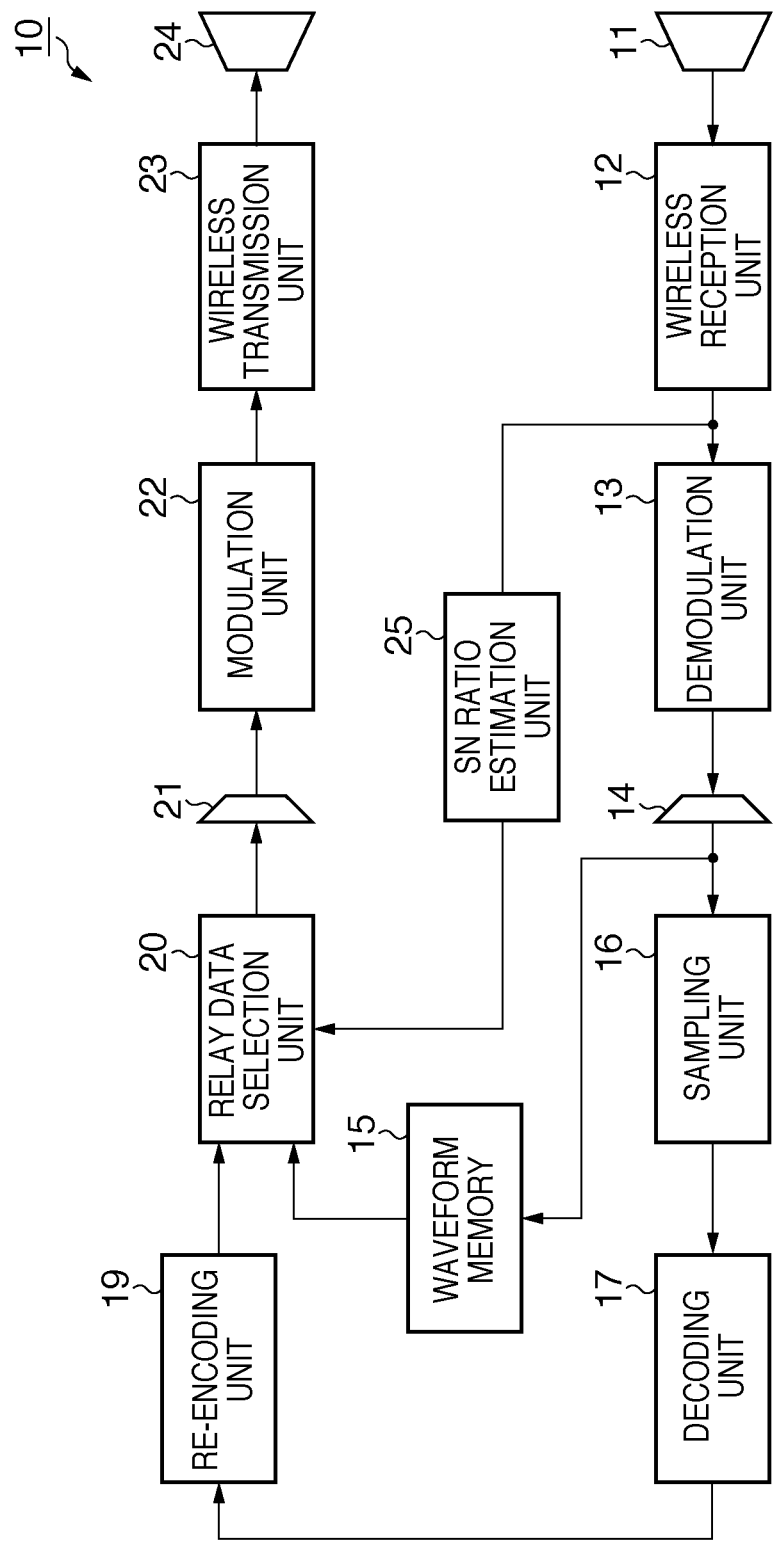
FIG. 5 is a block diagram showing an example of the arrangement of a relay apparatus according to the second embodiment.

FIG. 5 is a block diagram showing an example of the arrangement of a relay apparatus 10 according to the second embodiment. Note that the same reference numerals as in FIG. 1 which explains the first embodiment denote components having the same functions in FIG. 5, and a description thereof will sometimes be omitted.

The relay apparatus 10 includes an SN ratio estimation unit 25 in addition to the arrangement of the first embodiment. The SN ratio estimation unit 25 estimates the SN ratio of a received signal based on an intermediate frequency band signal received from a wireless reception unit 12. The estimated SN ratio is compared with a predetermined threshold. The threshold is used as a determination criterion to be used to determine whether data contains errors in number beyond the correction capability of an error correction code. For this purpose, a suitable value is set in advance based on an empirical rule or the like.

If the estimated SN ratio exceeds the threshold as a result of comparison, the SN ratio estimation unit 25 determines that the received data contains few errors and outputs data representing it to a relay data selection unit 20. If the estimated SN ratio does not exceed the threshold, the SN ratio estimation unit 25 determines that the received data contains many errors (beyond the correction capability of an error correction code) and outputs data representing it to the relay data selection unit 20.

Based on the control signal (SN ratio estimation result) from the SN ratio estimation unit 25, the relay data selection unit 20 selects one of re-encoded data from a re-encoding unit 19 and received digital data stored in a waveform memory 15. The selected data is output to a D/A converter 21 as transmission digital data. For example, when the SN ratio estimation unit 25 has determined that the received data (intermediate frequency band signal) contains few error bits (the SN ratio exceeds the threshold), the relay data selection unit 20 selects the re-encoded data as relay data and outputs it to the D/A converter 21.

On the other hand, when the SN ratio estimation unit 25 has determined that the received data contains many error bits (the SN ratio does not exceeds the threshold), the relay data selection unit 20 selects the received digital data stored in the waveform memory 15, which is received data before error correction processing, and outputs it to the D/A converter 21. As described above, the received digital data holds the metric value received by the relay apparatus 10.

The arrangements of the relay apparatus 10 according to the second embodiment has been described above. Note that the arrangement of a destination node 40 is the same as in FIG. 2 which explains the first embodiment, and a description thereof will not be repeated.

Figure 6:
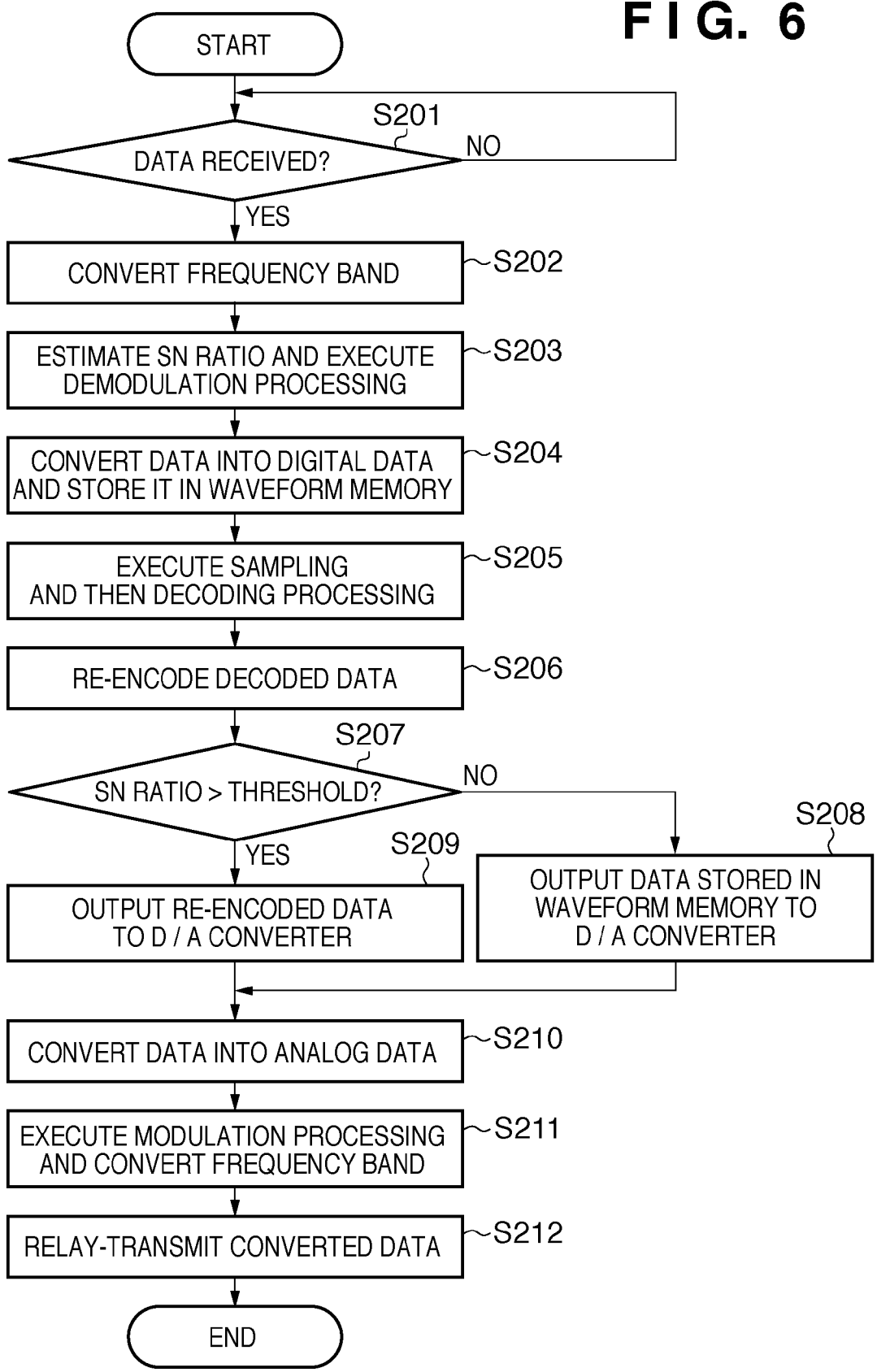
FIG. 6 is a flowchart illustrating an example of the operation of a relay apparatus 10 according to the second embodiment.

An example of the operation of the relay apparatus 10 according to the second embodiment will be described next with reference to FIG. 6. An operation of performing relay transmission will be exemplified here.

When a receiving antenna 11 of the relay apparatus 10 receives data (wireless signal), the processing starts (YES in step S201). When the processing has started, the relay apparatus 10 causes the wireless reception unit 12 to convert the frequency band of the received data (S202). Then, the relay apparatus 10 causes the SN ratio estimation unit 25 to estimate the SN ratio of the received signal based on the converted intermediate frequency band signal and also causes a demodulation unit 13 to demodulate the data to an analog reception baseband signal (S203).

Subsequently, the relay apparatus 10 causes an A/D converter 14 to convert the baseband signal into digital data. The converted received digital data is output to a sampling unit 16 and simultaneously stored in the waveform memory 15 (S204).

The relay apparatus 10 causes the sampling unit 16 to perform sampling and causes a decoding unit 17 to decode the sampled data bit string using an error correction code (S205). After that, the relay apparatus 10 causes the re-encoding unit 19 to re-encode the decoded data to generate re-encoded data (S206).

The relay apparatus 10 causes the relay data selection unit 20 to select, based on the SN ratio estimation result from the SN ratio estimation unit 25, one of the re-encoded data generated by the re-encoding unit 19 and the received digital data stored in the waveform memory 15. Upon determining based on the SN ratio estimation result that the estimated SN ratio exceeds the threshold (YES in step S207), the relay apparatus 10 causes the relay data selection unit 20 to select the re-encoded data and output it to the D/A converter 21 (S209). On the other hand, if the estimated SN ratio does not exceed the threshold (NO in step S207), the relay apparatus 10 causes the relay data selection unit 20 to select the data stored in the waveform memory 15 and output it to the D/A converter (S208). That is, the data before the error correction processing is output to the D/A converter 21.

After that, the relay apparatus 10 causes the D/A converter 21 to execute D/A conversion to convert the digital data into an analog transmission baseband signal (S210). A modulation unit 22 modulates the baseband signal to an intermediate frequency band signal. A wireless transmission unit 23 converts the intermediate frequency band signal into a high frequency band signal (S211). The relay apparatus 10 then transmits the converted data (wireless signal) from a transmission antenna 24 to the destination node (S212).

As described above, according to the second embodiment, the relay data is switched based on the SN ratio of the received signal. In this case as well, the same effects as in the first embodiment can be obtained.

Third Embodiment

The third embodiment will be described next. In the above-described first and second embodiments, a communication scheme by a single carrier wave using the BPSK modulation method has been exemplified. In the third embodiment, however, a communication scheme including secondary modulation such as an OFDM (Orthogonal Frequency Division Multiplex) communication scheme or a spread spectrum communication scheme will be explained. As the communication scheme including secondary modulation, the OFDM communication scheme will be exemplified.

Figure 7:
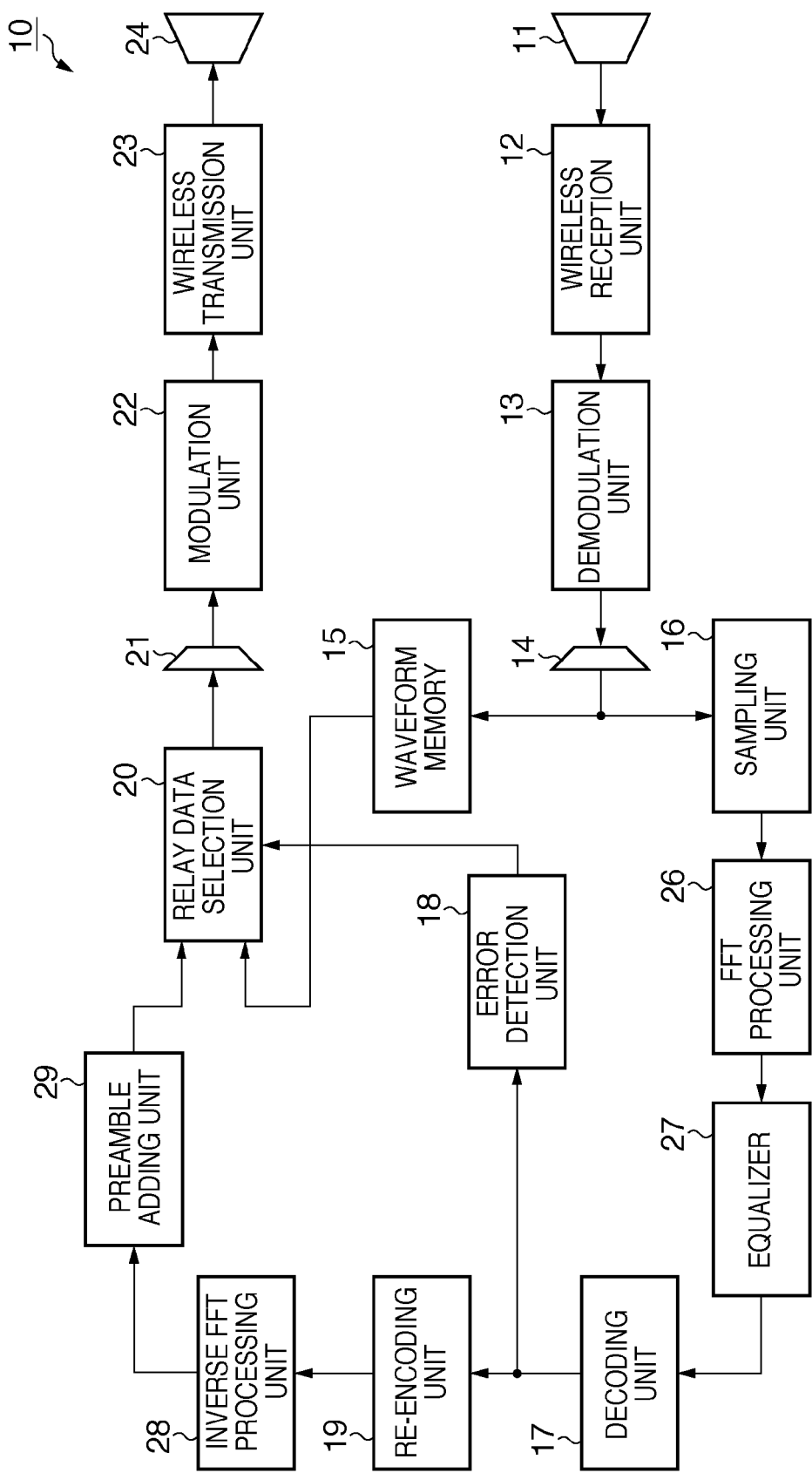
FIG. 7 is a block diagram showing an example of the arrangement of a relay apparatus 10 according to the third embodiment.

An example of the arrangement of a relay apparatus 10 according to the third embodiment will be described with reference to FIG. 7. Note that the same reference numerals as in FIG. 1 which explains the first embodiment denote components having the same functions in FIG. 7, and a description thereof will sometimes be omitted.

The relay apparatus 10 includes an FFT processing unit 26, equalizer 27, inverse FFT processing unit 28, and preamble adding unit 29 in addition to the arrangement of the first embodiment.

An A/D converter 14 converts an analog reception baseband signal obtained by processing of a demodulation unit 13 into received digital data. The converted received digital data is stored in a waveform memory 15 and also simultaneously sent to a sampling unit 16. Note that the received digital data according to the third embodiment is an OFDM signal as a time domain and holds the metric value of each data bit of a subcarrier.

The sampling unit 16 extracts, from the received digital data, data samples at sampling points necessary for Fourier transform (FFT). Note that if each OFDM symbol includes a guard interval according to the OFDM signal format, the sampling unit 16 removes the guard interval.

The FFT processing unit 26 performs Fourier transform processing of the time domain OFDM signal, thereby converting it into a frequency domain OFDM signal (frequency domain signal). The equalizer 27 corrects, in the frequency domain signal output from the FFT processing unit 26, variations in the phase and amplitude caused by the propagation characteristic. Data (packet) according to the third embodiment has the format shown in FIG. 8. In an OFDM signal according to this format, a preamble portion (signal concerning communication control) is added before a data payload portion that holds application data. The equalizer 27 estimates the propagation characteristic of the radio communication path using the preamble portion. The data payload portion is corrected based on the estimated propagation characteristic.

A decoding unit 17 executes error correction processing for the signal output from the equalizer 27. Channel encoding of the OFDM communication scheme often uses not only simple error correction encoding but also scrambling or interleaving. Hence, the decoding unit 17 executes, as needed, processing such as descrambling or deinterleaving necessary for those processes.

A re-encoding unit 19 executes error correction coding using the same scheme as that of the source node for the decoded data generated by the decoding unit 17, thereby encoding the decoded data again. If scrambling or interleaving is performed in addition to the error correction coding, the re-encoding unit 19 also executes processing such as scrambling or interleaving, like the decoding unit 17. Note that the re-encoded data generated by the re-encoding unit 19 is a frequency domain OFDM signal.

Figure 8:
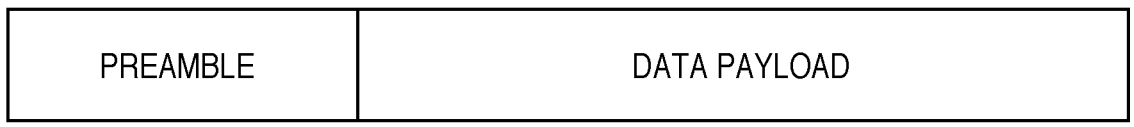
FIG. 8 is a view showing an example of a data (packet) format according to the third embodiment.

The inverse FFT processing unit 28 performs inverse Fourier transform to convert the frequency domain OFDM signal into a time domain OFDM signal. The preamble adding unit 29 adds a preamble to the top of the OFDM signal. Data having the format shown in FIG. 8 is thus obtained.

Based on a control signal (error detection result) from an error detection unit 18, a relay data selection unit 20 selects one of the re-encoded data generated by the re-encoding unit 19 and the received digital data stored in the waveform memory 15. Note that the SN ratio may be estimated as in the second embodiment, and the relay data may be selected based on the estimation result.

Examine a case in which the relay data selection unit 20 selects the re-encoded data as relay data. In this case, the data (wireless signal) to be relay-transmitted from the relay apparatus 10 to a destination node 40 has the same waveform as that of the signal which has just been transmitted from a source node 30 without the influence of propagation characteristic. In other words, the wireless signal relay-transmitted from the relay apparatus 10 contains no propagation characteristic from the source node 30 to the relay apparatus 10. The signal received by the destination node 40 contains only the propagation characteristic from the relay apparatus 10 to the destination node 40.

As described above, when the relay apparatus 10 is to relay-transmit re-encoded data, the preamble adding unit 29 generates the preamble portion of the data to be relay-transmitted. The preamble portion is the same as that included in the OFDM signal which has just been transmitted from the source node 30. For this reason, the preamble portion received by the destination node 40 includes only the propagation characteristic from the relay apparatus 10 to the destination node 40. The destination node 40 therefore receives the data payload portion and the preamble portion which are influenced by the same propagation characteristic. Hence, the destination node 40 (equalizer 49 to be described later) can accurately correct the influence of the propagation characteristic on the data payload portion by referring to the received preamble portion.

Examine a case in which the relay data selection unit 20 selects the received digital data stored in the waveform memory 15 as relay data. In this case, the waveform memory 15 stores not only the data payload portion but also the preamble portion as a time waveform. Both the waveform of the preamble portion and that of the data payload portion stored in the waveform memory 15 include the propagation characteristic from the source node 30 to the relay apparatus 10. For this reason, when the preamble portion and the data payload portion are relay-transmitted, the propagation characteristic from the relay apparatus 10 to the destination node 40 is further superimposed on the relay data. In this case as well, the destination node 40 receives the data payload portion and the preamble portion which are influenced by the same propagation characteristic. Hence, the destination node 40 (equalizer 49 to be described later) can accurately correct the influence of the propagation characteristic on the data payload portion by referring to the received preamble portion.

Figure 9:
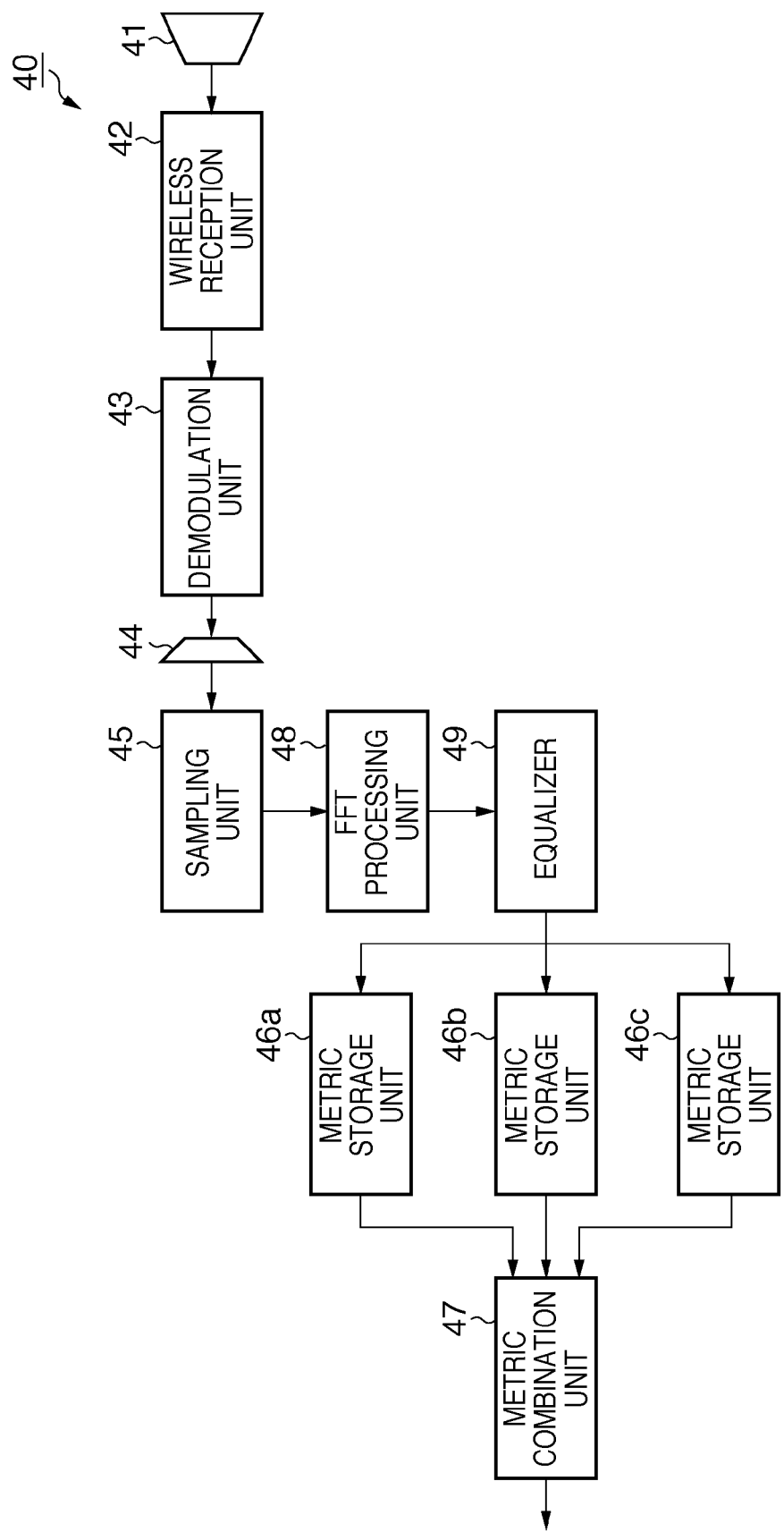
FIG. 9 is a block diagram showing an example of the arrangement of a destination node 40 according to the third embodiment.

An example of the arrangement of the destination node 40 according to the third embodiment will be described next with reference to FIG. 9. Note that the same reference numerals as in FIG. 2 which explains the first embodiment denote components having the same functions in FIG. 9, and a description thereof will sometimes be omitted.

The destination node 40 includes an FFT processing unit 48 and the equalizer 49 as functions necessary for OFDM reception in addition to the arrangement of the first embodiment.

The FFT processing unit 48 performs Fourier transform processing of the time domain OFDM signal, thereby converting it into a frequency domain OFDM signal. The equalizer 49 performs correction for the frequency domain OFDM signal converted by the FFT processing unit 48. More specifically, the equalizer 49 corrects variations in the phase and amplitude caused by the propagation characteristic. At this time, the equalizer 49 estimates the propagation characteristic using the preamble portion and corrects the data payload portion with reference to the estimated propagation characteristic.

As described above, according to the third embodiment, it is possible to appropriately select the preamble portion to be added in relay transmission. This enables to obtain the same effects as in the first embodiment even in the modulation scheme including secondary modulation such as the OFDM scheme.

The first to third embodiments have been described above. The above-described embodiments can be modified as needed without departing from the spirit and scope of the invention. For example, the second and third embodiments may be combined. More specifically, if an error is detected or the SN ratio exceeds a threshold, data in the waveform memory 15 is relay-transmitted. Otherwise, re-encoded data is relay-transmitted.

In the above-described first to third embodiments, three communication paths exist. However, the present invention is not limited to this. For example, it is possible to cope with various numbers of communication paths by increasing or decreasing the number of metric storage units 46 (or storage areas) in the destination node 40.

In the above-described first to third embodiments, the relay apparatus, destination node, and source node have been explained as separate apparatuses. However, the present invention is not limited to this. For example, the relay apparatus and the source node may be implemented as a single apparatus having a transmission function and relay function of transmitting transmission data. Alternatively, the relay apparatus and the destination node may be implemented as a single apparatus (communication apparatus).

Fourth Embodiment

The fourth embodiment will be described next. An example of the arrangement of a communication apparatus according to the fourth embodiment will be explained with reference to FIG. 10. A CPU 110 controls the entire communication apparatus. A RAM 120 temporarily stores programs and data. A ROM 130 stores programs and parameters which require no change. A communication interface 140 implements a communication function. The arrangement of the communication apparatus has been described above. However, a communication apparatus 100 need not always have the arrangement. Functions such as a storage device and a display device may be added as needed.

Figure 10:
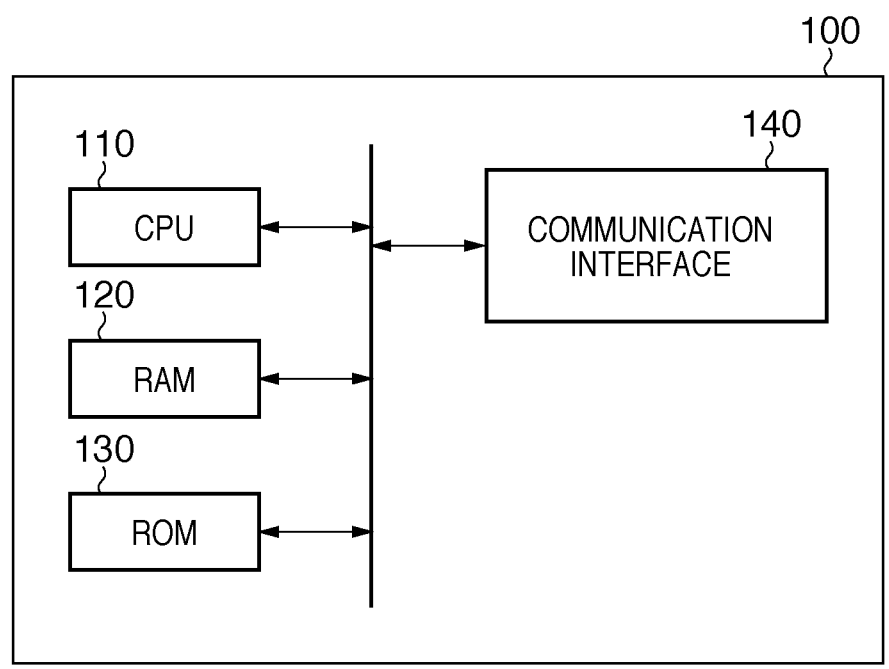
FIG. 10 is a block diagram showing an example of the arrangement of a communication apparatus according to the fourth embodiment.
Figure 11:
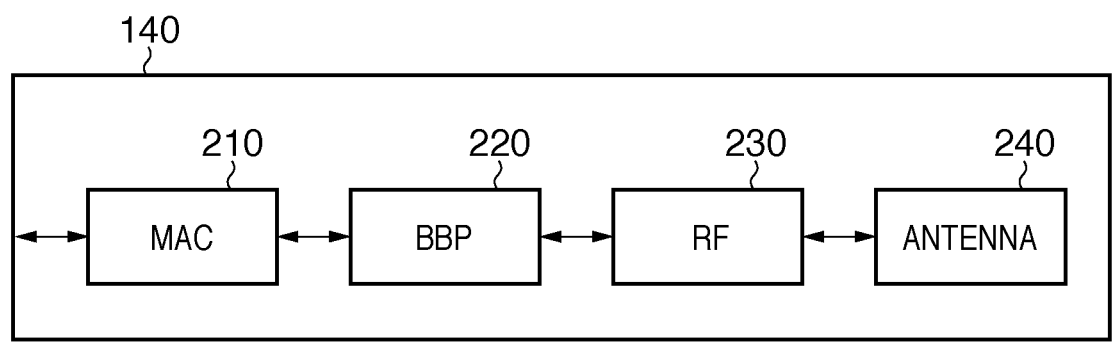
FIG. 11 is a block diagram showing an example of the arrangement of a communication interface 140 shown in FIG. 10.

The arrangement of the communication interface 140 shown in FIG. 10 will be described next with reference to FIG. 11. Note that the communication interface 140 of this embodiment implements wireless communication.

A MAC (Medium Access Controller) 210 manages a medium access layer. A BBP (Base Band Processor) 220 has a communication signal processing function (e.g., error correction coding, decoding, and modulation/demodulation). An RF (Radio Frequency) 230 processes a baseband signal in the carrier frequency band. An antenna 240 transmits/receives a modulated carrier frequency band signal in the radio section.

Figure 12:
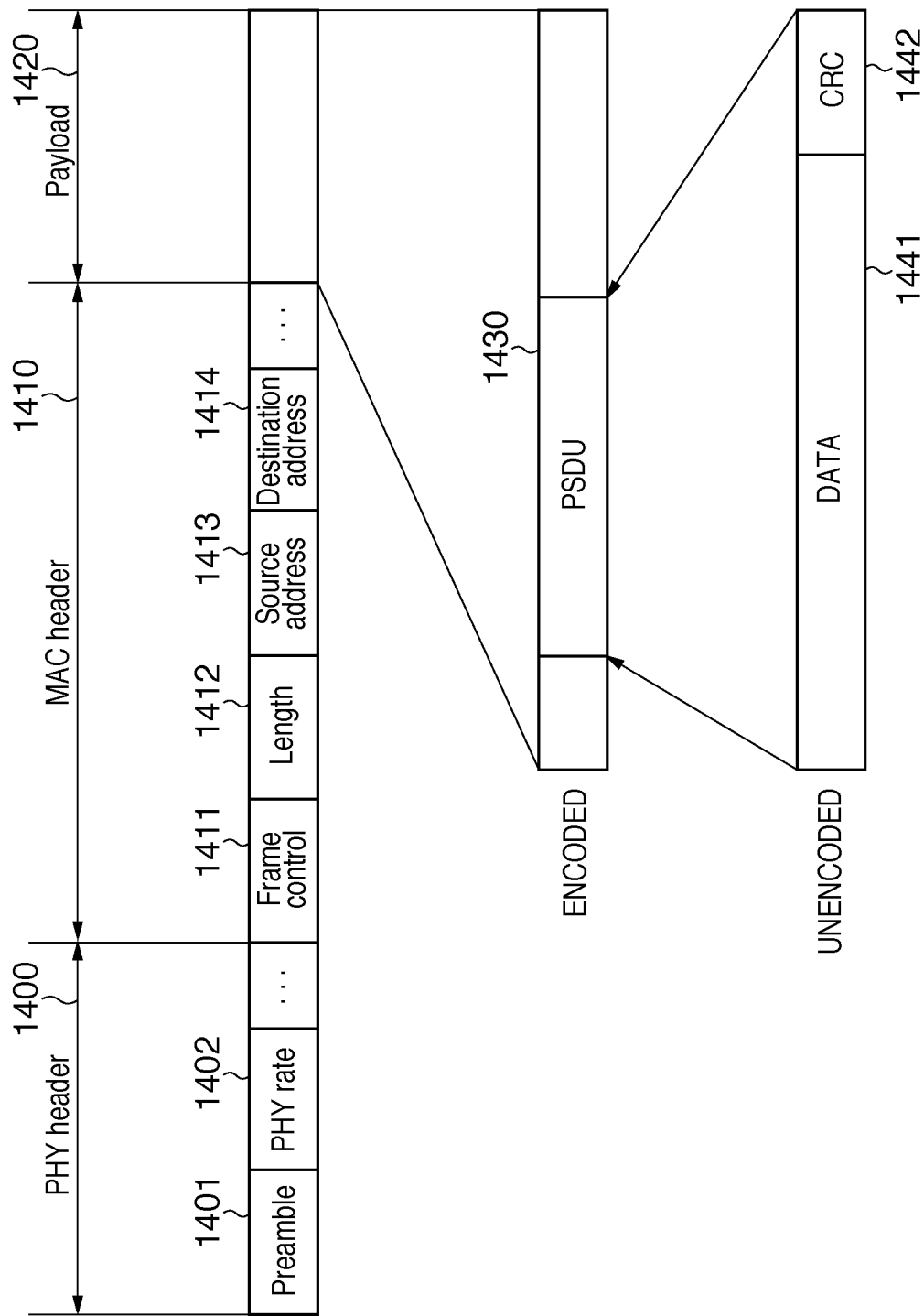
FIG. 12 is a view showing an example of a packet frame format according to the fourth embodiment.

A packet frame format according to the fourth embodiment will be explained with reference to FIG. 12.

A PHY header 1400 is a block to be processed by the BBP 220. A MAC header 1410 is a block to be processed by the MAC 210. The chronological order of this packet is set from left to right.

The PHY header 1400 includes at least a Preamble (a signal associated with communication control) 1401 and a PHY rate 1402. The Preamble 1401 is used to detect or synchronize the packet. The PHY rate 1402 describes a physical layer rate used in packet transmission.

The MAC header 1410 includes at least a Frame Control 1411, Length 1412, Source address 1413, and Destination address 1414. The Frame Control 1411 describes a packet type. The Length 1412 describes the length of the Payload 1420. The Source address 1413 describes a transmission source address. The Destination address 1414 describes a transmission destination address.

A field of a Payload 1420 follows the MAC header 1410. The Payload 1420 includes at least a PSDU 1430. The PSDU 1430 is generated by causing an Encoder 410 (FIG. 14) to encode unencoded data 1441 and a CRC (Cyclic Redundancy Code) 1442.

Figure 13:
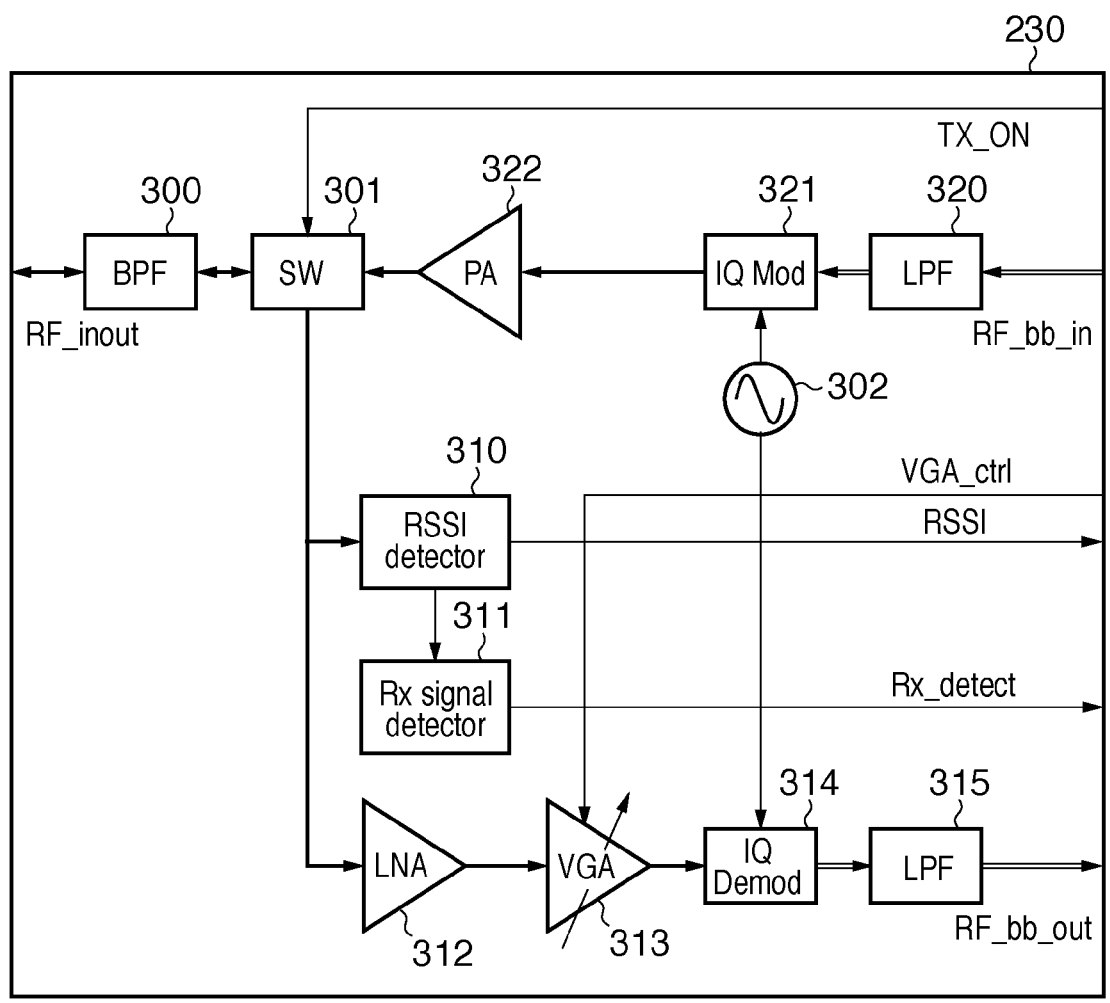
FIG. 13 is a block diagram showing an example of the arrangement of an RF 230 shown in FIG. 11.

An example of the arrangement of the RF 230 shown in FIG. 11 will be described next with reference to FIG. 13.

The RF 230 receives/outputs an RF signal from/to the antenna 240 using an RF_inout port. A BPF (BandPass Filter) 300 is a filter configured to restrict the band of a transmission signal to a desired frequency band. A SW 301 is a switch configured to switch transmission/reception to/from the RF_inout port. This switching is done based on a Tx_Rx_ctrl signal.

An RSSI (Received Signal Strength Indication) detector 310 outputs a received signal strength RSSI in the RF band. When the value output from the RSSI detector 310 is more than or equal to a predetermined threshold, an Rx Signal detector 311 outputs an Rx_detect signal representing reception of a signal.

An LNA (Low Noise Amplifier) 312 amplifies a received signal in the RF band. A VGA (Variable Gain Amplifier) 313 amplifies the received signal in the RF band while adjusting the amplification gain in accordance with an AGC_Ctrl signal serving as a variable gain control signal. A local oscillator 302 generates the center frequency of the desired RF signal.

An IQ Demod (In-phase and Quadrature-phase demodulator) 314 performs quadrature demodulation of the received signal in the RF band using the output from the local oscillator 302 and outputs an IQ quadrature modulated signal in the baseband. An LPF (Low Pass Filter) 315 is a low-pass filter capable of attenuating a predetermined cutoff frequency or more. The LPF 315 outputs the received signal as an RF_bb_out signal.

An LPF 320 is a filter configured to pass only a low frequency by removing a high frequency signal from an RF_bb_in signal to input a re-modulated signal to the RF 230. An IQ mod (In-phase and Quadrature-phase modulator) 321 converts the RF_bb_in signal into an RF transmission signal having a desired center frequency. A PA (Power Amplifier) 322 amplifies the signal level. The signal passes through the BPF 300 so that a transmission signal in the RF band is output from the RF_inout port to the antenna 240.

Figure 14:
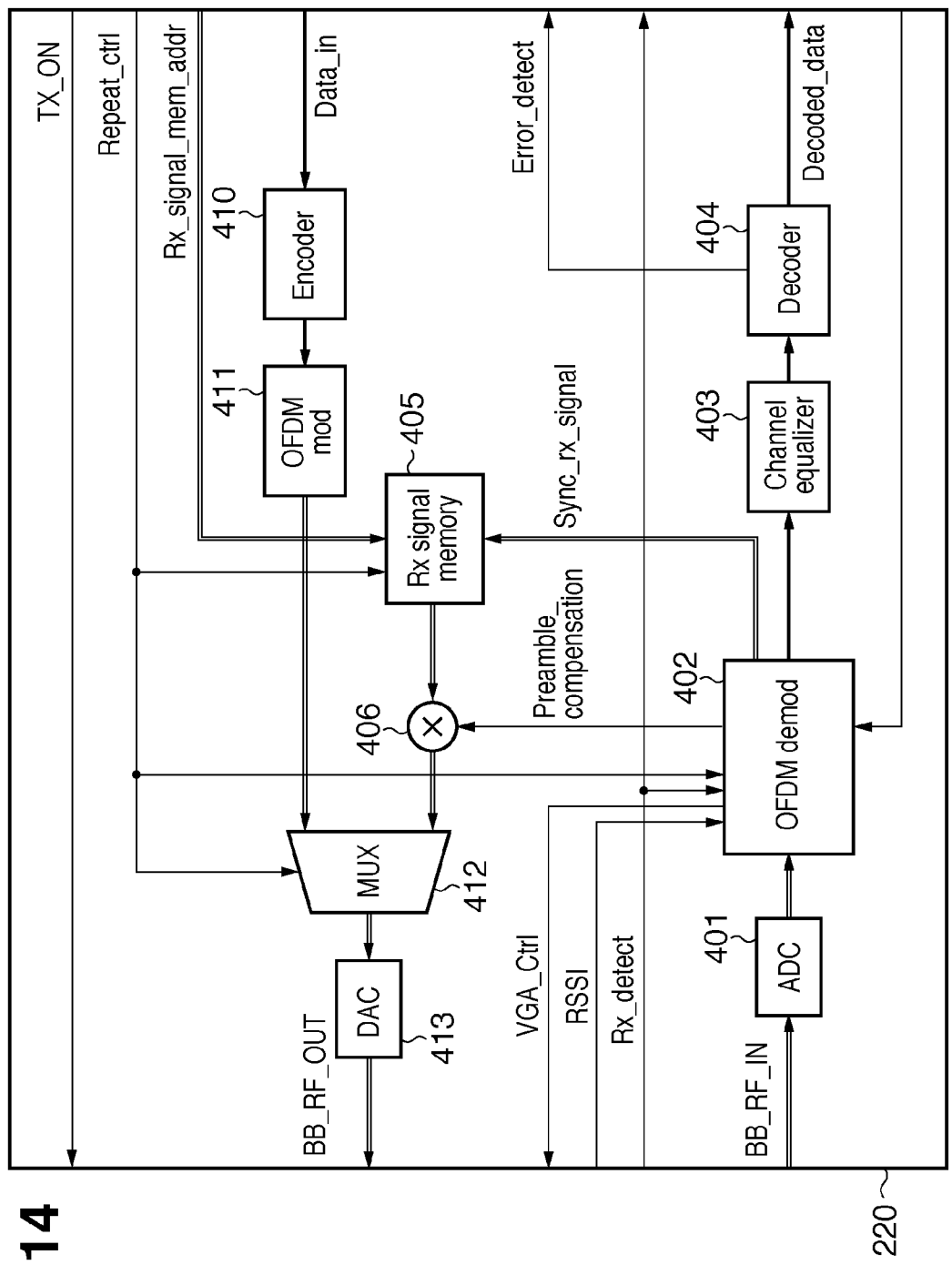
FIG. 14 is a block diagram showing an example of the arrangement of a BBP 220 shown in FIG. 11.

An example of the arrangement of the BBP 220 shown in FIG. 11 will be described next with reference to FIG. 14.

An ADC (Analogue to Digital Converter) 401 converts a baseband input signal BB_RF_IN into a digital signal. An OFDM demod 402 demodulates the received OFDM signal and outputs a demodulated signal. The OFDM demod 402 outputs a VGA_Ctrl signal serving as a received signal amplification gain control signal by referring to an RSSI signal. Upon receiving a Repeat_ctrl signal of H level, the OFDM demod 402 outputs a Preamble_compensation signal.

A Channel equalizer 403 corrects the signal strength of Demod_signal_in for each frequency. The output from the Channel equalizer 403 passes through a Decoder 404 and is output as Decoded_data (decoded data). The Decoder 404 also outputs an Error_detect signal representing whether an error has been detected from the Decoded_data (decoded data).

An Rx signal memory 405 serves as a temporary storage device to store a Sync_rx_signal signal (demodulated signal). Upon receiving the Repeat_ctrl signal of L level, the Rx signal memory 405 writes the Sync_rx_signal signal while referring to a memory address value represented by an Rx_signal_mem_addr signal. Upon receiving the Repeat_ctrl signal of H level, the Rx signal memory 405 reads out and outputs the Sync_rx_signal signal while referring to the memory address value represented by the Rx_signal_mem_addr signal. The output is input to a multiplier 406. The Preamble portion is multiplied by the Preamble_compensation signal to correct the signal strength. Then, the signal is input to a multiplexer (MUX) 412. Upon receiving the Repeat_ctrl signal of H level, the multiplexer 412 outputs the corrected Sync_rx_signal signal. Upon receiving the Repeat_ctrl signal of L level, the multiplexer 412 outputs the input from an OFDM mod 411 to a DAC (Digital to Analogue Converter) 413. The Encoder 410 encodes a data_in signal (decoded data (unencoded PSDU)) to generate the Payload 1420. The OFDM mod 411 converts the input signal into an OFDM modulated signal. The DAC (Digital to Analogue Converter) 413 outputs a BB_RF_OUT (re-modulated signal) modulated by the OFDM mod 411 as an analog modulated signal.

An example of the arrangement of the OFDM demod 402 shown in FIG. 14 will be described next with reference to FIG. 15.

An input signal input from the ADC 401 to the OFDM demod 402 is further restricted to a desired frequency band by an FIR (Finite Impulse Response) filter 500. The output from the FIR filter 500 is input to an AFC (Automatic Frequency Controller) 501. The AFC 501 corrects the frequency and phase of the input signal and outputs the Sync_rx_signal signal. The AFC 501 simultaneously counts symbols and outputs the count value as Symbol_cnt. The Sync_rx_signal signal output from the AFC 501 is input to a GI (Guard Interval) remover 502. The GI remover 502 removes the guard interval portion from the input signal. The output from the GI remover 502 is input to an FFT (Fast Fourier Transformer) 503. The FFT 503 converts the time-base signal into a frequency signal and outputs a demodulated signal.

The output from the FIR filter 500 is also input to an AGC (Automatic Gain Controller) 510. The AGC 510 outputs a VGA_Ctrl signal serving as a received signal amplification gain control signal based on the Preamble portion by referring to the RSSI signal.

Upon receiving the Rx_detect signal of H level, a PGC (Preamble Gain Controller) 511 stores the change value and convergent value of the VGA_Ctrl signal during the Preamble period. The PGC 511 includes at least internal registers reg_p 512 and reg_q 513. The PGC 511 also includes a Symbol timer 514 which reproduces the symbol timing of received data. When the Rx signal memory 405 shown in FIG. 14 outputs the Sync_rx_signal signal, the PGC 511 outputs the Preamble_compensation signal so as to make the output value during the Preamble period coincide with the convergent value.

Figure 16:
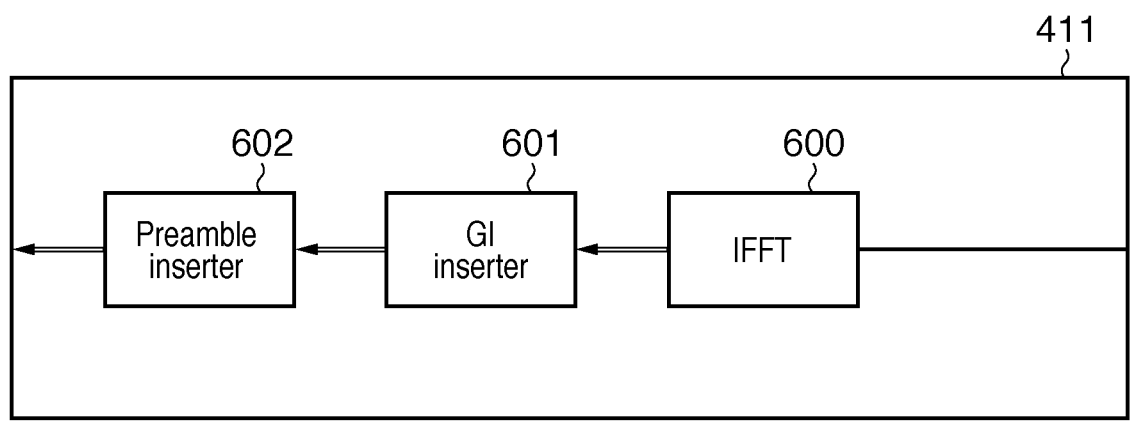
FIG. 16 is a block diagram showing an example of the arrangement of an OFDM mod 411 shown in FIG. 14.

An example of the arrangement of the OFDM mod 411 shown in FIG. 14 will be described next with reference to FIG. 16.

An IFFT (Inverse FFT) 600 receives a demodulated signal or an encoded signal and generates a re-modulated signal based on the input signal. Note that one of a demodulated signal and an encoded signal is selectively input to the IFFT 600 based on the reception state (e.g., amount of generated errors) of the received signal.

A GI inserter 601 adds a GI to the re-modulated signal and outputs the signal. The output from the GI inserter 601 is input to a Preamble inserter 602. The Preamble inserter 602 (newly) adds a Preamble to the input re-modulated signal.

Figure 17:
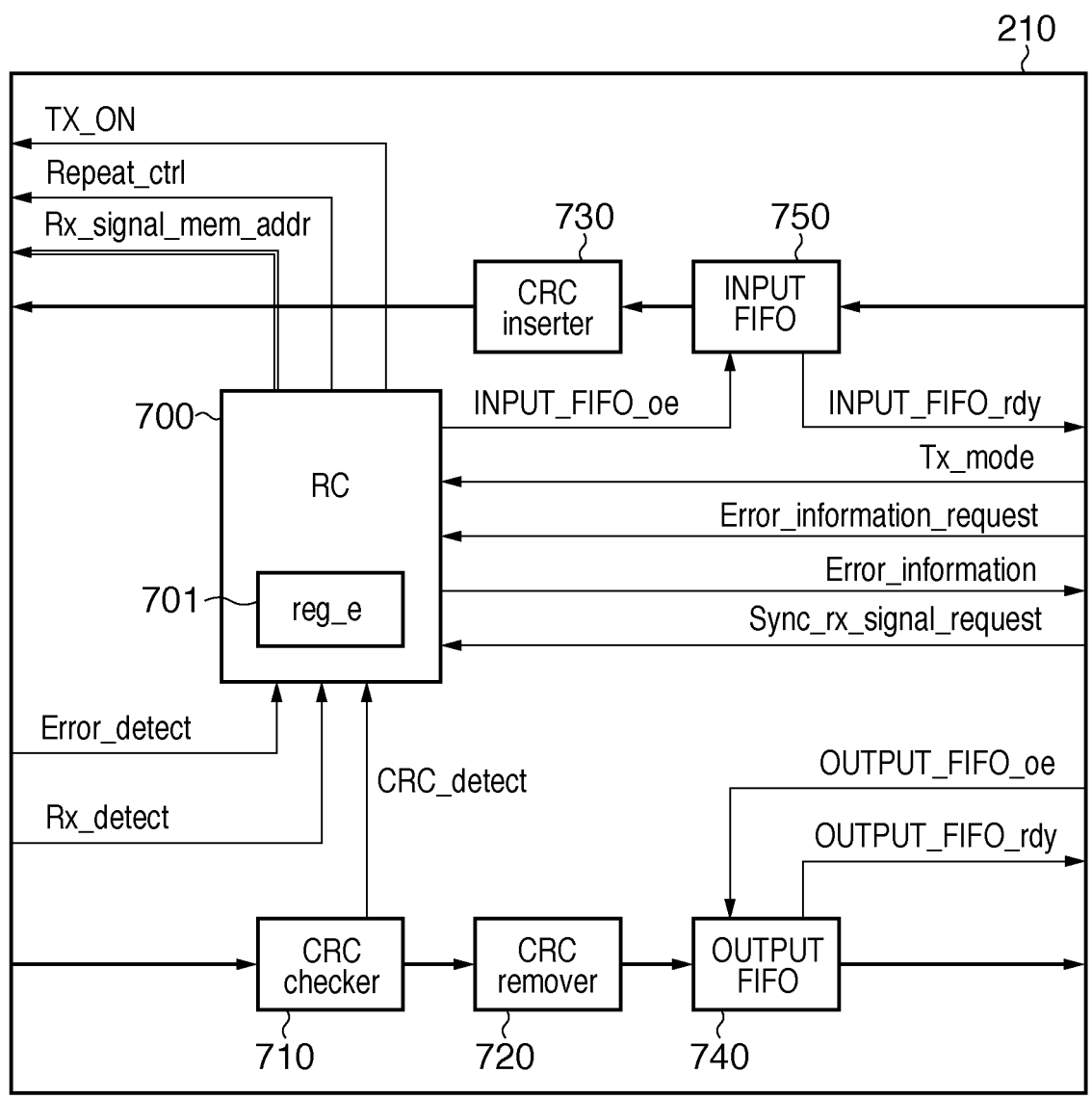
FIG. 17 is a block diagram showing an example of the arrangement of a MAC 210 shown in FIG. 11.

An example of the arrangement of the MAC 210 shown in FIG. 11 will be described next with reference to FIG. 17.

An RC (Repeat Controller) 700 is a controller configured to control the MAC 210.

The RC 700 includes at least an internal register reg_e 701 to temporary store whether the received data contains an error. A CRC Checker 710 detects an error from data obtained by decoding the PSDU 1430 and outputs the error detection result to the RC 700 as CRC_detect.

A CRC Remover 720 removes the CRC portion and outputs only decoded data. An OUTPUT FIFO (First In First Out) 740 is a memory buffer configured to temporarily store the decoded data. In a memory full state, the OUTPUT FIFO 740 outputs OUTPUT_FIFO_rdy of H level. Upon receiving OUTPUT_FIFO_oe of H level, the OUTPUT FIFO 740 reads out the temporarily stored data.

An INPUT FIFO 750 is a memory buffer configured to temporarily store transmission data. The INPUT FIFO 750 can write data when an INPUT_FIFO_rdy signal of H level is output. Upon receiving an INPUT_FIFO_oe of H level, the INPUT FIFO 750 outputs the written data. A CRC inserter 730 performs CRC operation using input data. The CRC inserter 730 adds a CRC after the data to generate the PSDU 1430 and outputs it to the BBP 220.

Figure 15:
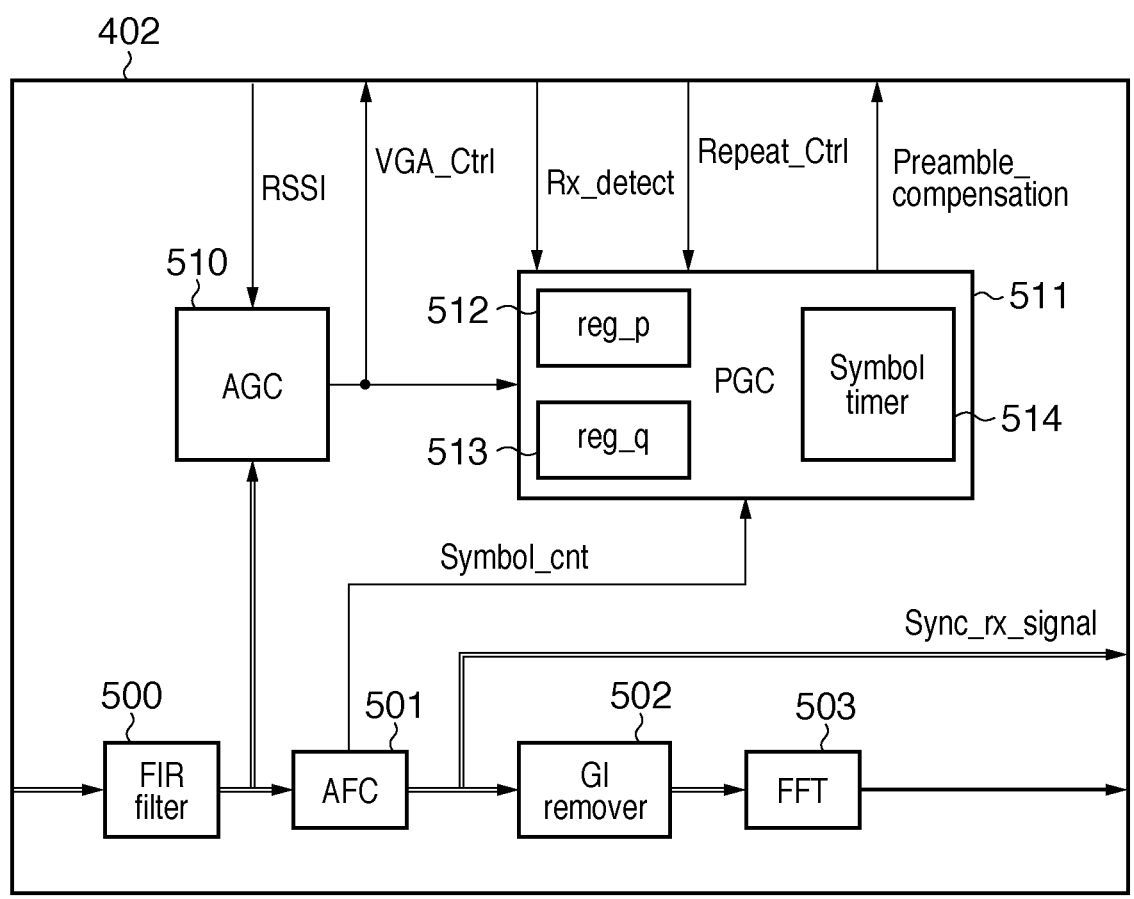
FIG. 15 is a block diagram showing an example of the arrangement of an OFDM demod 402 shown in FIG. 14.
Figure 18:
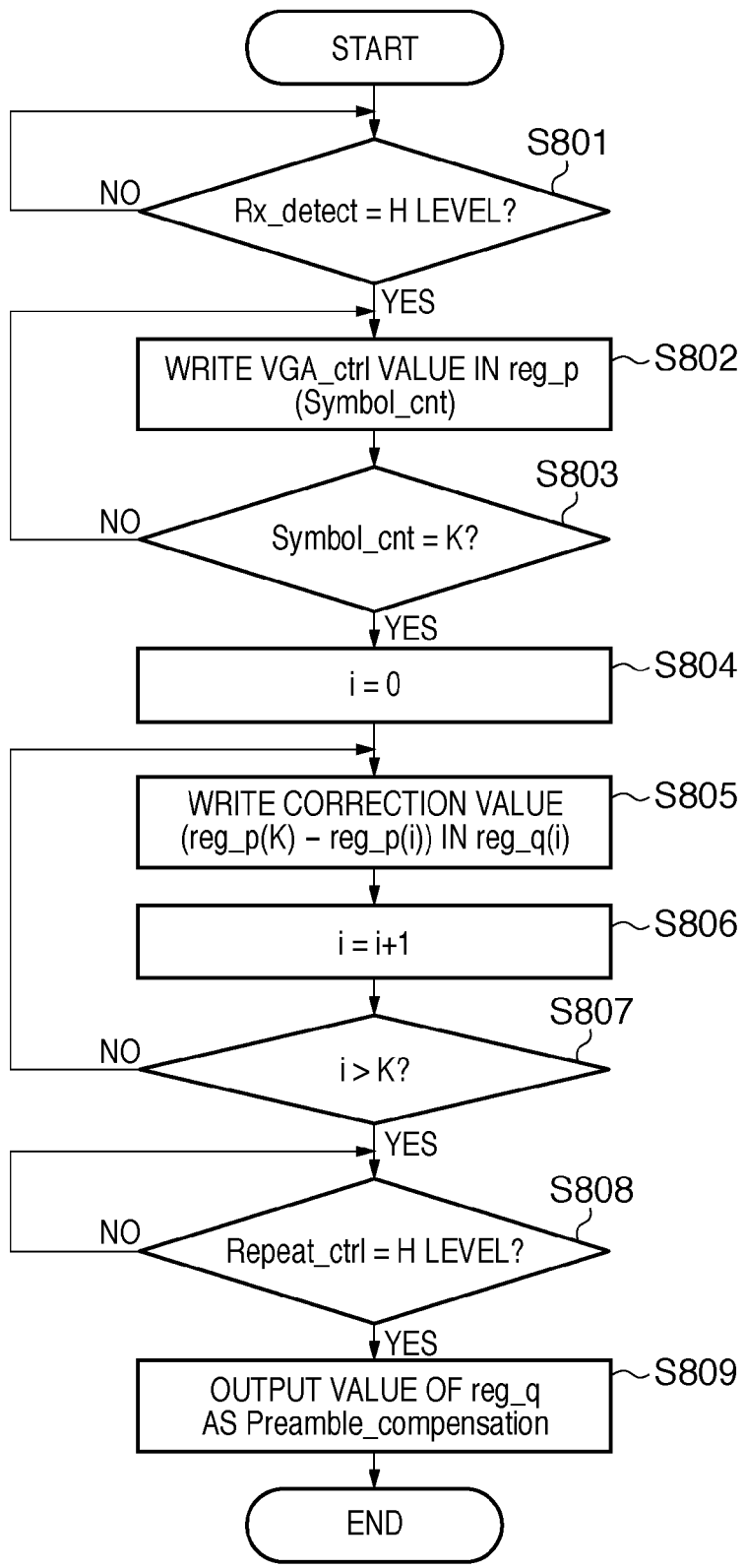
FIG. 18 is a flowchart illustrating an example of the operation of a PGC 511 shown in FIG. 15.

FIG. 18 is a flowchart illustrating an example of the operation of the PGC 511 shown in FIG. 15.

The PGC 511 determines first whether the Rx_detect signal of H level is input. This process is executed to determine whether a received signal exists. If the Rx_detect signal of H level is not input (NO in step S801), the PGC 511 determines that no received signal exists, and transits to a standby state. If the Rx_detect signal of H level is input (YES in step S801), the PGC 511 determines that a received signal has been input, and writes a VGA_ctrl value of the array of the internal register reg_p 512 (S802). The VGA_ctrl value is written for each symbol of the received signal. Note that this write processing is repeatedly performed until the VGA_ctrl value reaches a maximum value K of the symbol (NO in step S803). At this time, the PGC 511 stores the symbol timing in the processes of steps S802 and S803 in the Symbol timer 514.

When the VGA_ctrl value has reached the maximum value K of the symbol (YES in step S803), the PGC 511 determines that the VGA_ctrl value has converged, and calculates a correction value to reflect the VGA_ctrl value on all signals stored in the Rx signal memory 405.

In the correction value calculation processing, the PGC 511 sets 0 in a parameter i for internal register array reference (S804). The PGC 511 writes a correction value reg_p(K)-reg_p(i) in the internal register reg_q(i) (S805) and increments the parameter i (S806). This processing is repeatedly executed unless i exceeds K (NO in step S807). If i exceeds K (YES in step S807), the PGC 511 waits until the Repeat_ctrl signal changes to H level (NO in step S808).

When the Repeat_ctrl signal has changed to H level (YES in step S808), the PGC 511 outputs the value of the reg_q 513 as the output value of the Preamble_compensation signal (S809). This output is done in accordance with the Symbol timer 514.

Figure 19:
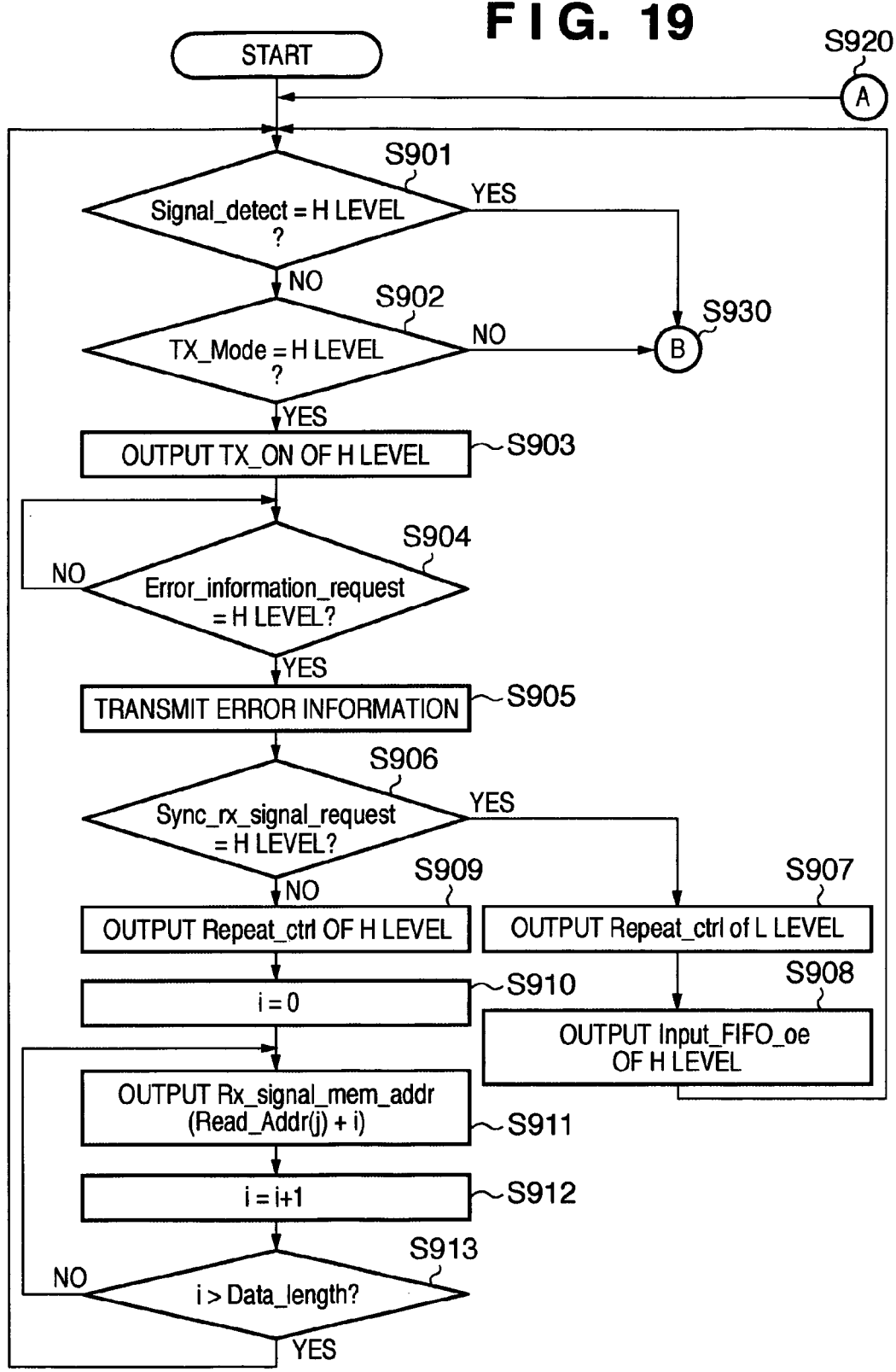
FIG. 19 is a first flowchart illustrating an example of the operation of an RC 700 shown in FIG. 17.
Figure 20:
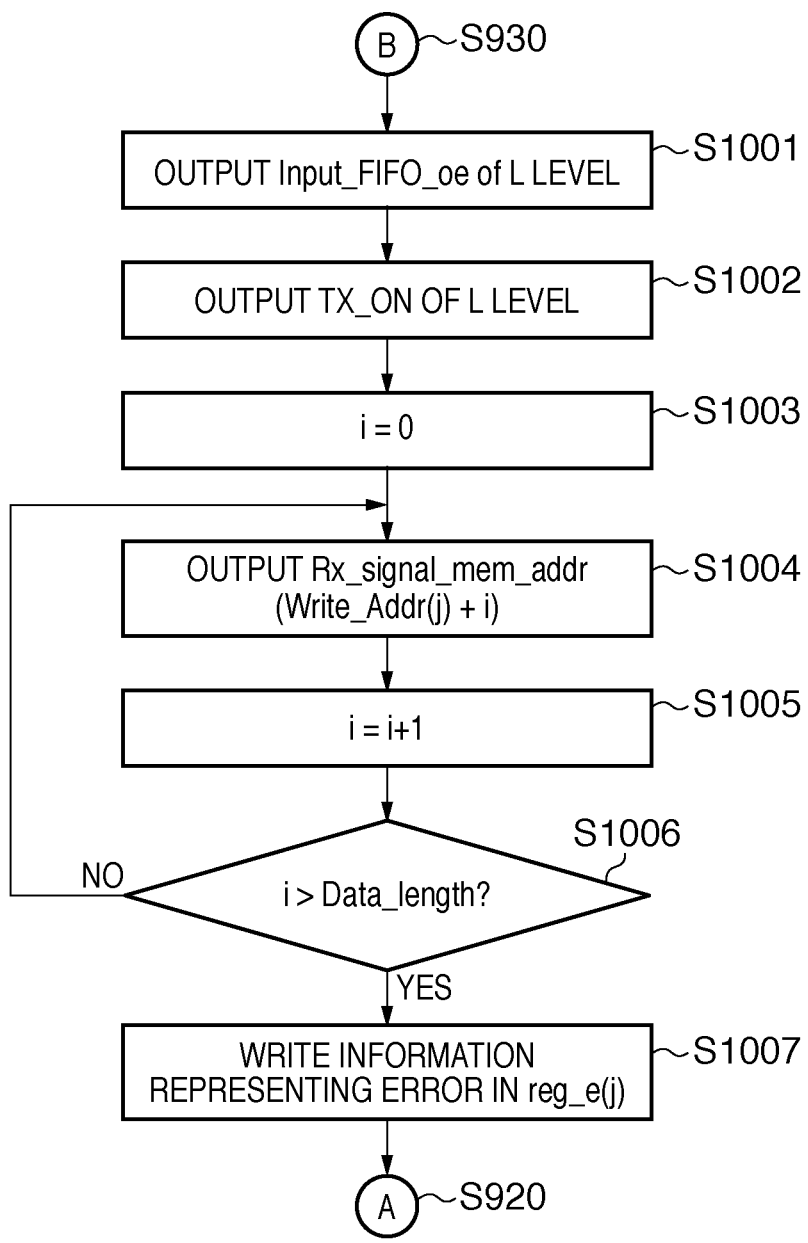
FIG. 20 is a second flowchart illustrating an example of the operation of the RC 700 shown in FIG. 17.

An example of the operation of the RC 700 shown in FIG. 17 will be described next with reference to FIGS. 19 and 20.

An example of the operation for transmission will be explained first with reference to FIG. 19. The RC 700 determines first whether the Rx_detect signal of H level is input. This process is executed to determine whether a received signal exists. If the Rx_detect signal of H level is input (YES in step S901), the RC 700 executes the process in step S930 to be described later in detail. If the Rx_detect signal of H level is not input (NO in step S901), the RC 700 determines whether a Tx_mode signal of H level is input. This process is executed to determine whether the CPU 110 is requesting a transmission mode. If the Tx_mode signal of H level is not input (NO in step S902), the RC 700 determines that the transmission mode is not being requested, and executes the process in step S930 to be described later in detail. If the Tx_mode signal of H level is input (YES in step S902), the RC 700 outputs a TX_ON signal of H level to set the BBP 220 and the RF 230 in the transmission state (S903).

After that, the RC 700 waits until an Error_information_request signal from the CPU 110 changes to H level (NO in step S904). When this signal has changed to H level (YES in step S904), the RC 700 notifies the CPU 110 of the value of the internal register reg_e 701 as error information (S905).

After the notification, the RC 700 determines whether a Sync_rx_signal_request signal of H level is input. The Sync_rx_signal_request signal indicates whether to refer to the Rx signal memory 405. If the Sync_rx_signal_request signal of H level is input (YES in step S906), the RC 700 outputs the Repeat_ctrl signal of L level. This disables the output from the Rx signal memory 405 (S907). After the RC 700 has transmitted decoded data by outputting the INPUT_FIFO_oe signal of H level (S908), the process returns to step S901.

If the Sync_rx_signal_request signal of H level is not input in step S906 (NO in step S906), the RC 700 outputs the Repeat_ctrl signal of H level (S909). This enables the output from the Rx signal memory 405. After that, the RC 700 resets the temporary parameter i for the address counter of the Rx signal memory 405 to (S910). The RC 700 also outputs the output value of the Rx_signal_mem_addr signal (S911). This output value is obtained by adding i to Read_addr(j) representing the read address of the received signal as the transfer target.

After the output, the RC 700 increments i (S912), and determines whether i has exceeded Data_length which is the data length of the received signal. If i has not exceeded Data_length (NO in step S913), the process returns to step S911. If i has exceeded Data_length (YES in step S913), the process returns to step S901.

An example of the operation for reception will be explained next with reference to FIG. 20. Note that FIG. 20 illustrates the process in step S930 of FIG. 19. That is, this process starts when the Rx_detect signal of H level or the Tx_mode signal of L level is input to the RC 700.

First, the RC 700 outputs the INPUT_FIFO_oe signal of L level. This prohibits transmission of decoded data (S1001). The RC 700 also outputs the TX_ON signal of L level to set the BBP 220 and the RF 230 in the reception state (S1002). The RC 700 resets the temporary parameter i for the address counter of the Rx signal memory 405 to 0 (S1003).

The RC 700 adds i to Write_addr(j) representing the write address of the received signal as the transfer target, and outputs the sum as the Rx_signal_mem_addr signal (S1004). The RC 700 increments i (S1005).

The RC 700 determines whether i has exceeded Data_length which is the data length of the received signal. If i has not exceeded Data_length (NO in step S1006), the process in step S1004 is executed again. If i has exceeded Data_length (YES in step S1006), the RC 700 writes the OR of the Error_detect signal and the CRC_detect signal in the internal register reg_e(j) 701 (S1007). The OR is information representing whether the received data contains an error.

Figure 21:
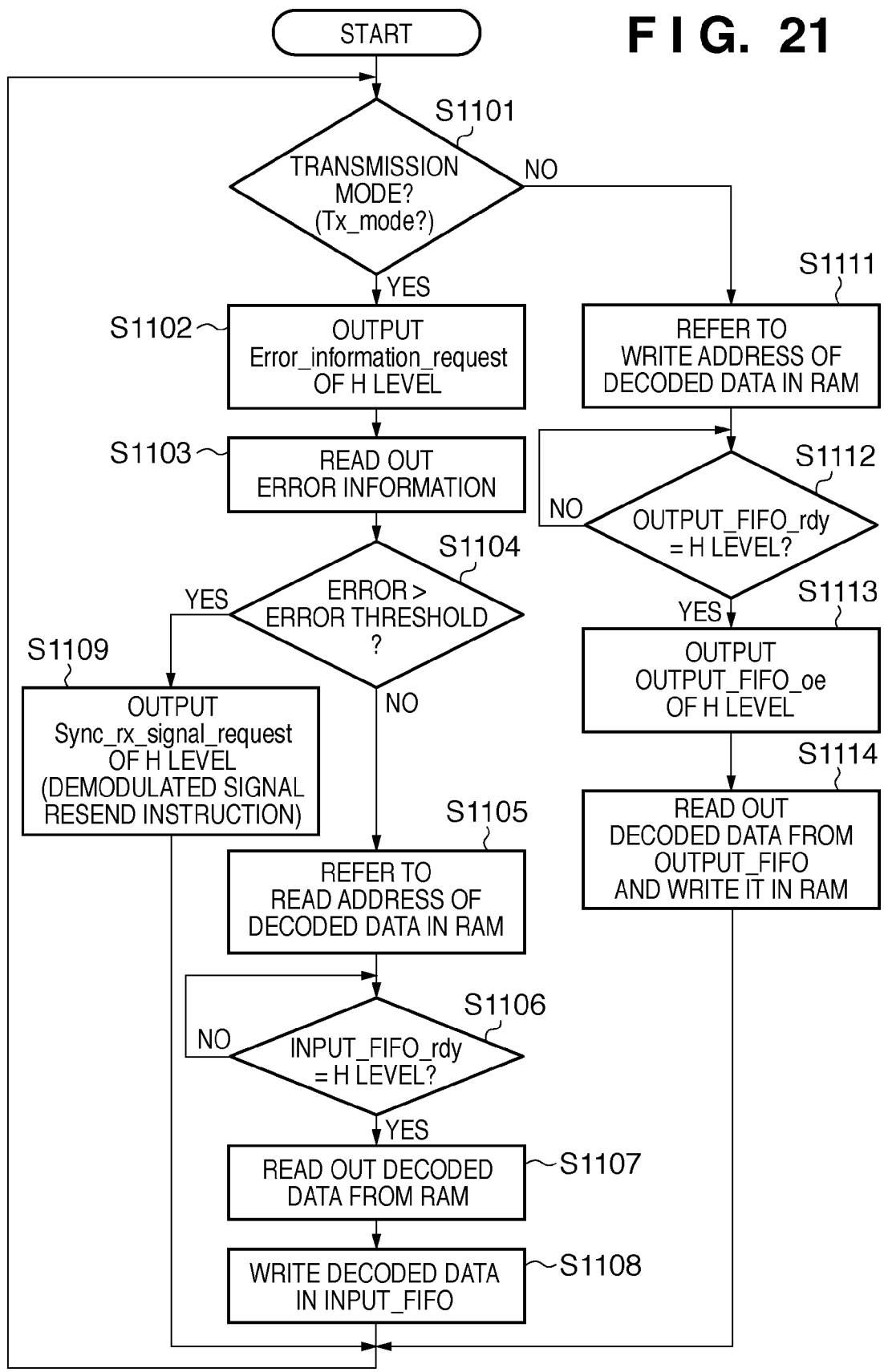
FIG. 21 is a flowchart illustrating an example of the operation of a CPU 110 shown in FIG. 10.

An example of the operation of the CPU 110 shown in FIG. 10 will be described next with reference to FIG. 21.

First, the CPU 110 determines whether the mode is the transmission mode. If the mode is the transmission mode (YES in step S1101), the CPU 110 inputs the Error_information_request signal of H level to the RC 700 (S1102). With this process, the value of the internal register reg_e 701 of the RC 700 is read out as error information (S1103).

Next, the CPU 110 determines based on the value of the referred error information whether the number of errors in the decoded data is more than an error threshold. If the number of errors is more than the error threshold (YES in step S1104), the CPU 110 outputs the Sync_rx_signal_request signal of H level to the RC 700 without re-encoding the decoded data (S1109). This aims at resending the Sync_rx_signal signal (demodulated signal) stored in the Rx signal memory 405. The process then returns to step S1101.

On the other hand, if the number of errors is not more than the error threshold (NO in step S1104), the CPU 110 refers to the read address of the RAM 120 which stores the decoded data (S1105). The CPU 110 determines whether the INPUT_FIFO_rdy signal of H level is output. This process is executed to determine whether the INPUT FIFO 750 is write-accessible.

Upon determining as a result that the INPUT_FIFO_rdy signal is not at H level (NO in step S1106), the CPU 110 waits until the signal changes to H level. If the signal is at H level (YES in step S1106), the CPU 110 reads out the decoded data from the RAM 120 (S1107) and writes it in the INPUT FIFO 750 (S1108). The process returns to step S1101 again.

If the mode is not the transmission mode in step S1101 (NO in step S1101), the CPU 110 performs the operation for reception. In the reception, the CPU 110 first refers to the write address of the RAM 120 to temporarily store the decoded data (S1111). Next, the CPU 110 determines whether the OUTPUT_FIFO_rdy signal of H level is output. This process is executed to determine whether the OUTPUT FIFO 740 is read-accessible. If the OUTPUT_FIFO_rdy signal is not at H level (NO in step S1112), the CPU 110 waits until the signal changes to H level. If the signal is at H level (YES in step S1112), the CPU 110 outputs the OUTPUT_FIFO_oe signal of H level (S1113). The CPU 110 thus reads out the decoded data from the OUTPUT FIFO 740 and writes the readout decoded data in the RAM 120 (S1114). The process then returns to step S1101 again.

Figure 22B:
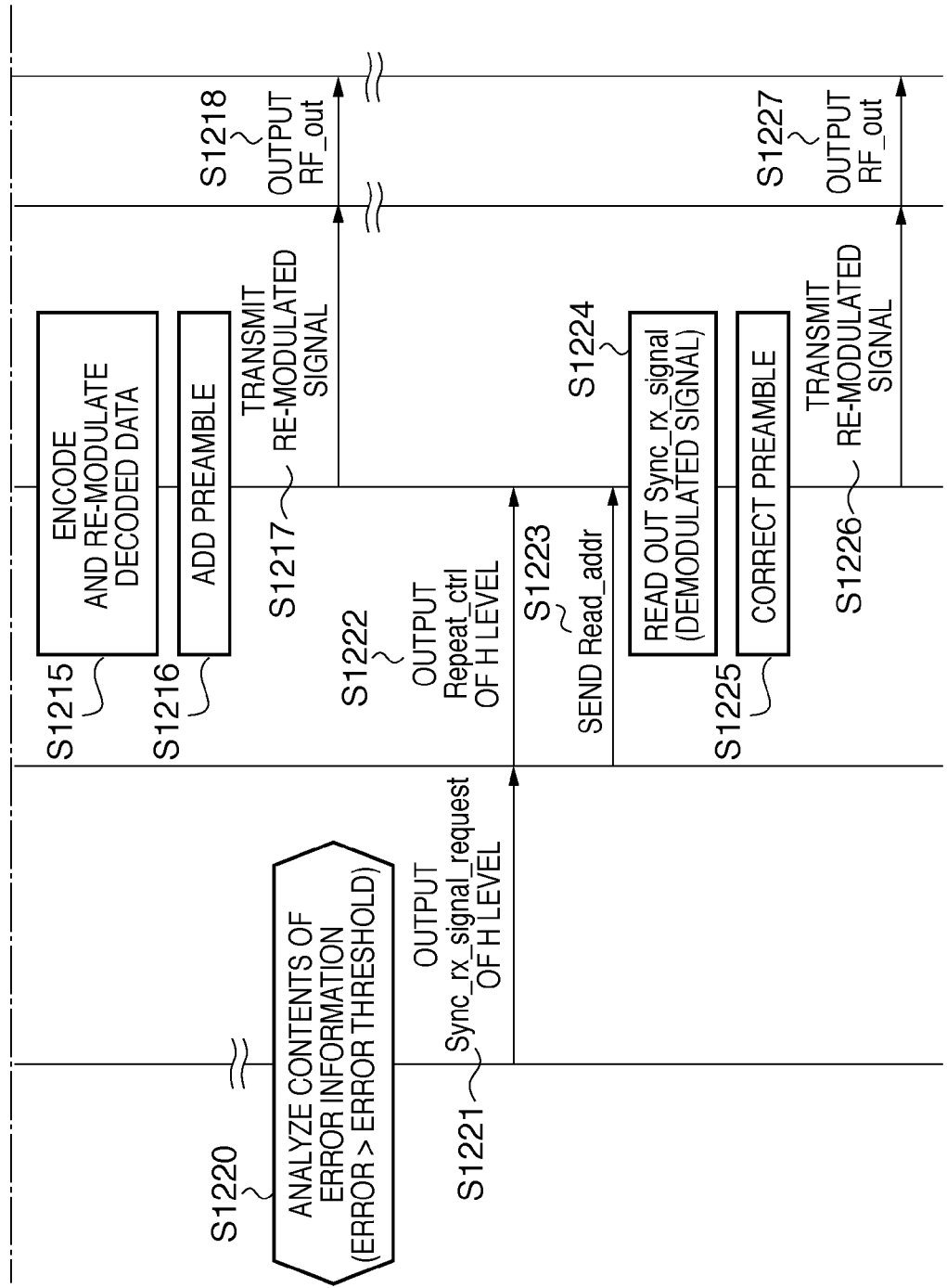

An example of the chart of a message sequence upon transmission by the communication apparatus 100 shown in FIG. 10 will be described with reference to FIGS. 22A and 22B.

The CPU 110 sets the entire communication apparatus 100 in the transmission mode (Tx mode) (S1201), and outputs the Tx_mode signal of H level to the MAC 210 (S1202). Upon receiving the Tx_mode signal, the MAC 210 outputs the TX_ON signal of H level to the BBP 220 and the RF 230 (S1203).

The CPU 110 also outputs the Error_information_request signal of H level (S1204). The CPU 110 thus requests error information of the MAC 210. The MAC 210 returns the value of the internal register reg_e 701 to the CPU 110 as error information (S1205). The CPU 110 analyzes the contents of the error information and switches the subsequent processing. A case in which the number of errors in the decoded data is not more than the error threshold will be explained first (S1210). In this case, the MAC 210 outputs the INPUT_FIFO_rdy signal of H level to the CPU 110 (S1211). The MAC 210 thus notifies the CPU 110 that the INPUT FIFO 750 is write-accessible.

The CPU 110 transmits the decoded data to the MAC 210 (S1212). The MAC 210 adds a CRC to the decoded data (S1213) and transfers it to the BBP 220 (S1214). The BBP 220 causes the Encoder 410 to re-encode the decoded data (unencoded PSDU) and also causes the OFDM mod 411 to re-modulate the data (S1215). Then, the BBP 220 causes the Preamble inserter 602 to add a Preamble to the re-modulated signal (S1216). When the re-modulated signal has been generated in this way, the BBP 220 causes the DAC 413 to convert the BB_RF_OUT (re-modulated signal) into an analog modulated signal and output it to the RF 230 (S1217). The RF 230 outputs the RF_out signal to the antenna 240, thereby transmitting the data onto the radio channel (S1218).

A case in which the number of errors in the decoded data is more than the error threshold will be explained next (S1220). That is, this processing is executed when the CPU 110 has determined by analyzing the contents of error information that the number of errors in the decoded data is more than the error threshold.

The CPU 110 first outputs the Sync_rx_signal_request signal of H level to the MAC 210 (S1221). The MAC 210 outputs the Repeat_ctrl signal of H level to the BBP 220 (S1222). The MAC 210 also notifies the BBP 220 of a Read_addr value that is the read address start value of the Rx signal memory 405 (S1223). The BBP 220 reads out the Sync_rx_signal signal (S1224). The BBP 220 causes the multiplier 406 to multiply the Preamble portion of the Sync_rx_signal signal by the Preamble_compensation signal. The signal strength of the Preamble portion of the Sync_rx_signal signal is thus corrected (S1225). After that, The BBP 220 causes the DAC 413 to convert the corrected Sync_rx_signal signal (re-modulated signal) into an analog modulated signal and output it to the RF 230 (S1226). The RF 230 outputs the RF_out signal to the antenna 240, thereby transmitting the data onto the radio channel (S1227).

An example of the message sequence upon reception by the communication apparatus 100 shown in FIG. 10 will be described with reference to FIG. 23.

The CPU 110 sets the entire communication apparatus 100 in the reception mode (Rx mode) (S1301), and outputs the Tx_mode signal of L level to the MAC 210 (S1302). Upon receiving the Tx_mode signal, the MAC 210 outputs the TX_ON signal of L level to the BBP 220 and the RF 230 (S1303). The MAC 210 notifies the BBP 220 of the Write_addr value that is the write address start value of the Rx signal memory 405 and then waits for reception of the RF signal (S1304).

The antenna 240 receives an Rx_in signal that is the received signal on the radio channel, and transmits the signal to the RF 230 (S1311). The RF 230 outputs the RF_bb_out signal to the BBP 220 (S1312). The RF 230 also outputs the RSSI and the Rx_detect signal of H level to the BBP 220 (S1313 and S1314). The BBP 220 outputs the Rx_detect signal to the MAC 210.

The BBP 220 causes the ADC 401 to convert the received RF_bb_out signal into a digital signal and causes the AFC 501 to output the Sync_rx_signal signal whose frequency and phase have been adjusted (S1321). The BBP 220 also writes the Sync_rx_signal signal in the Rx signal memory 405 (S1322). The BBP 220 OFDM-demodulates the Sync_rx_signal signal (S1323) and causes the Decoder 404 to decode the demodulated signal obtained by the OFDM demodulation. Decoded data is thus generated (S1324).

The BBP 220 outputs the decoded data (i.e., PSDU) to the MAC 210 (S1325), and outputs the Error_detect signal representing whether an error is detected in the decoded data (S1326). Upon receiving the signal, the MAC 210 performs CRC check of the decoded data (S1331), and writes the OR of the CRC check result and the notification result in step S1326 in the internal register reg_e 701 (S1332). For example, if the data contains an error, the BBP 220 outputs the Error_detect signal to the MAC 210. The MAC 210 stores the error information in the internal register reg_e 701. The MAC 210 removes the CRC from the decoded data (PSDU) (S1333) and then outputs the data to the CPU 110 (S1334).

Fifth Embodiment

The fifth embodiment will be described next. Note that the overall arrangement and apparatus arrangement according to the fifth embodiment are the same as in FIGS. 10 and 11 which explain the fourth embodiment, and a description thereof will not be repeated. Different points will mainly be described here. A packet frame format of the fifth embodiment is also the same as in the fourth embodiment (FIG. 12).

Figure 24:
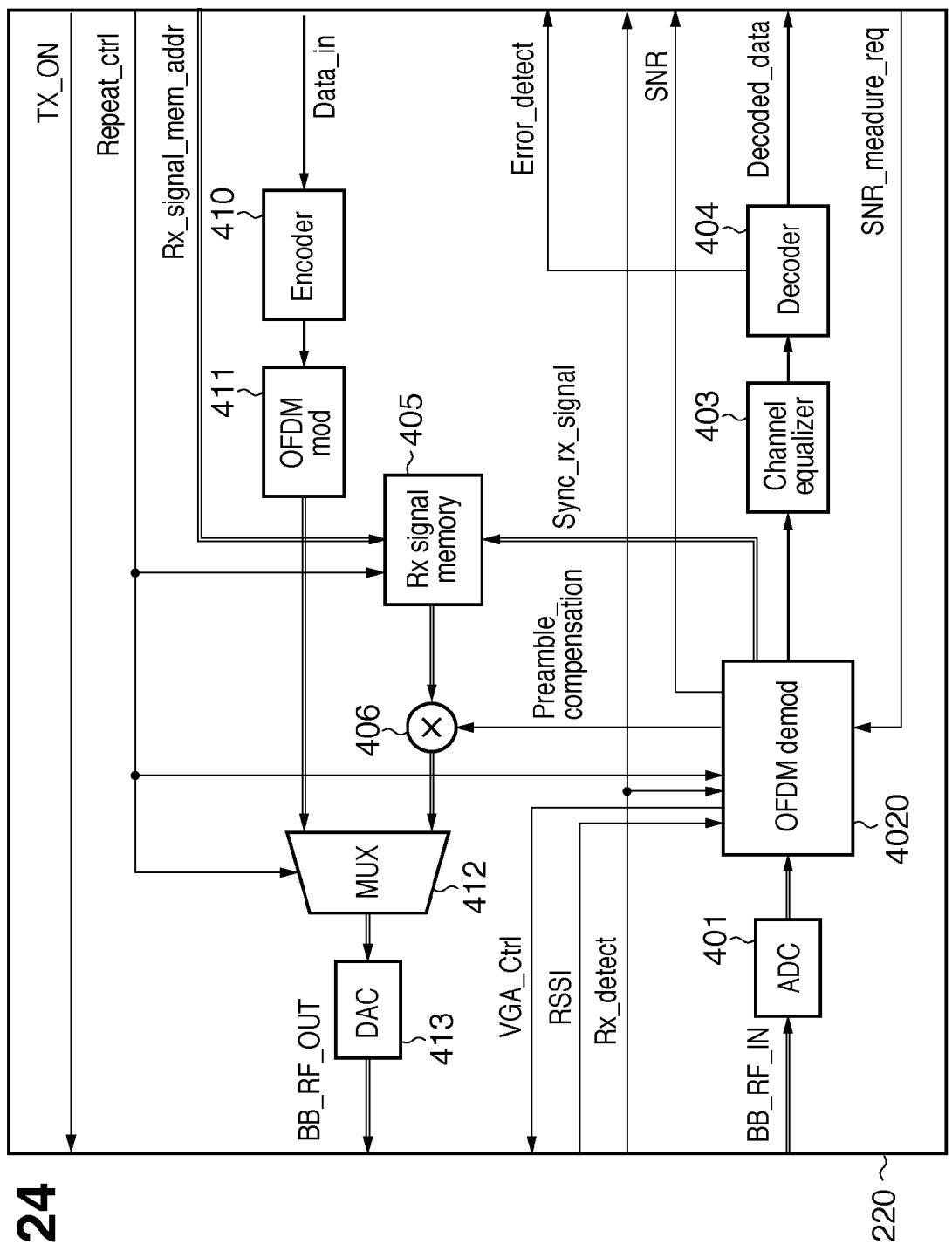
FIG. 24 is a block diagram showing an example of the arrangement of a BBP 220 according to the fifth embodiment.

An example of the arrangement of a BBP 220 according to the fifth embodiment will be described first with reference to FIG. 24. An OFDM demod 4020 has an SNR (Signal to Noise Ratio) measuring function, unlike FIG. 14 that explains the fourth embodiment. Accordingly, an SNR_measure_req signal and an SNR signal are added in FIG. 24. Note that the SNR represents the ratio of noise to a signal.

Figure 25:
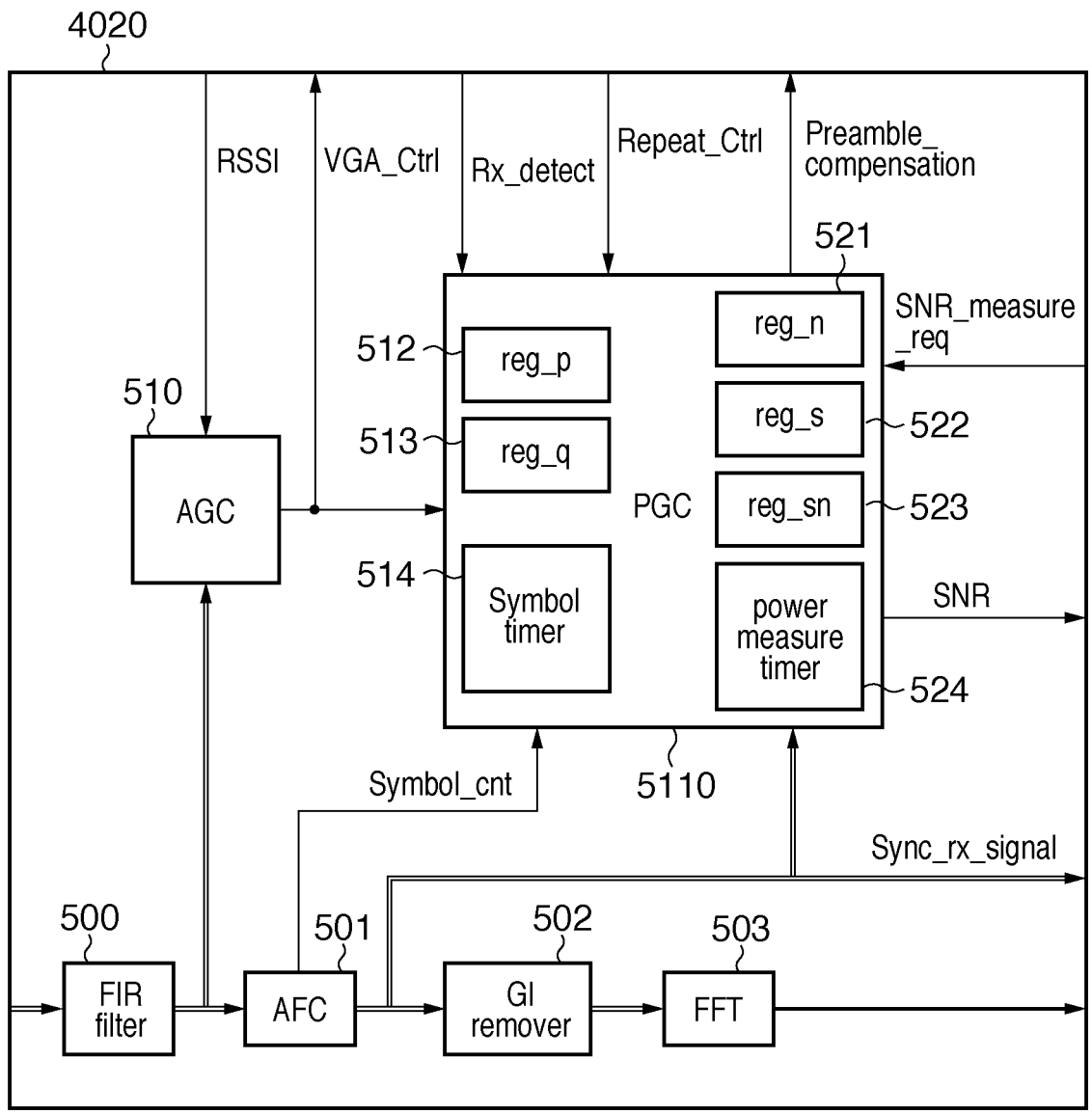
FIG. 25 is a block diagram showing an example of the arrangement of an OFDM demod 4020 according to the fifth embodiment.

An example of the arrangement of the OFDM demod 4020 according to the fifth embodiment will be described next with reference to FIG. 25. A PGC 5110 has an SNR measuring function, unlike FIG. 15 that explains the fourth embodiment. Accordingly, an SNR_measure_req signal, SNR signal, and Sync_rx_signal signal are added in FIG. 25.

The PGC 5110 includes a reg_n 521, reg_s 522, and reg_sn 523 as internal registers for SNR measuring, and a power measure timer 524 as a timer for signal power measuring in addition to the arrangement of the fourth embodiment.

Figure 26:
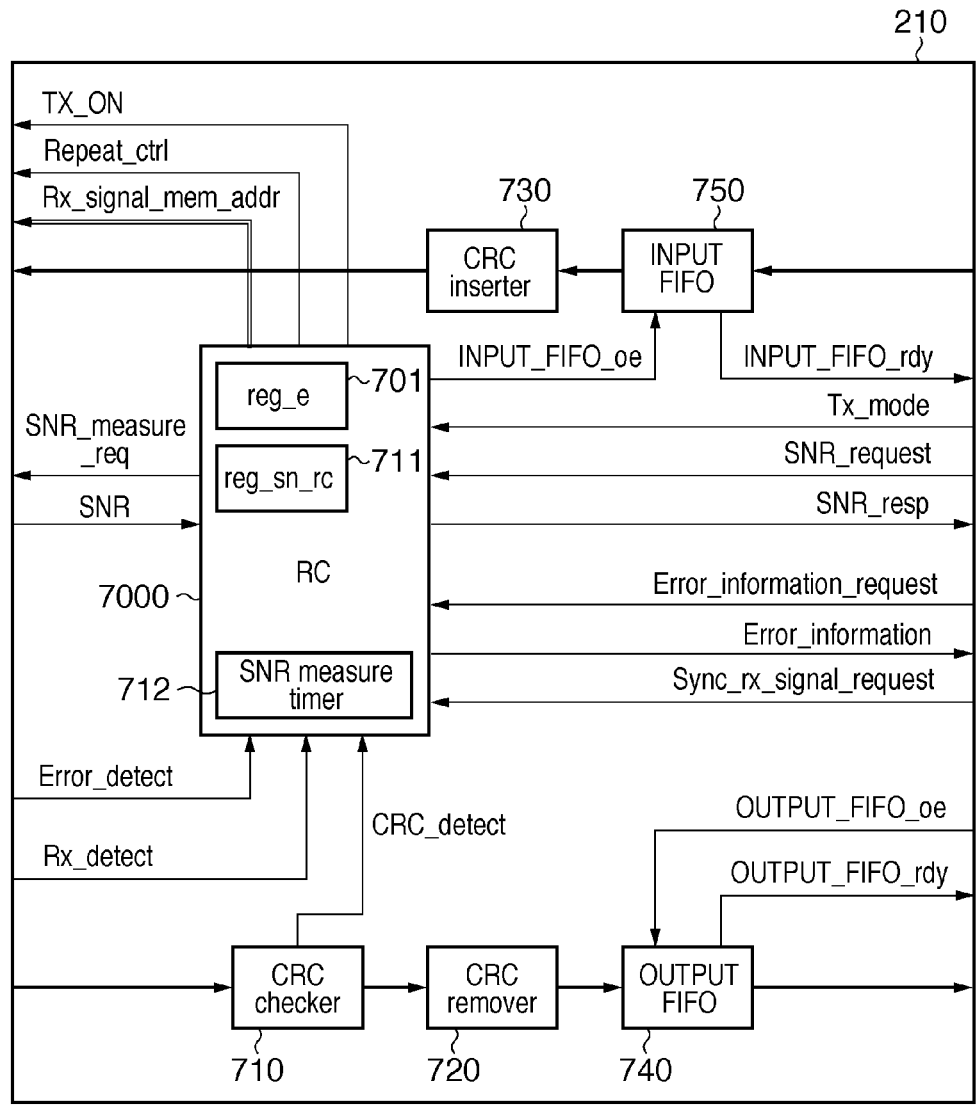
FIG. 26 is a block diagram showing an example of the arrangement of a MAC 210 according to the fifth embodiment.

An example of the arrangement of a MAC 210 according to the fifth embodiment will be described next with reference to FIG. 26. An RC 7000 acquires an SNR measuring request and a measured value, unlike FIG. 17 that explains the fourth embodiment. Accordingly, an SNR_measure_req signal, SNR signal, SNR_request signal, and SNR_resp signal are added in FIG. 26.

The RC 7000 includes a reg_sn_rc 711 as an internal register for temporarily storing an SNR, and an SNR measure timer 712 as a timer for SNR measuring in addition to the arrangement of the fourth embodiment.

Figure 27A:
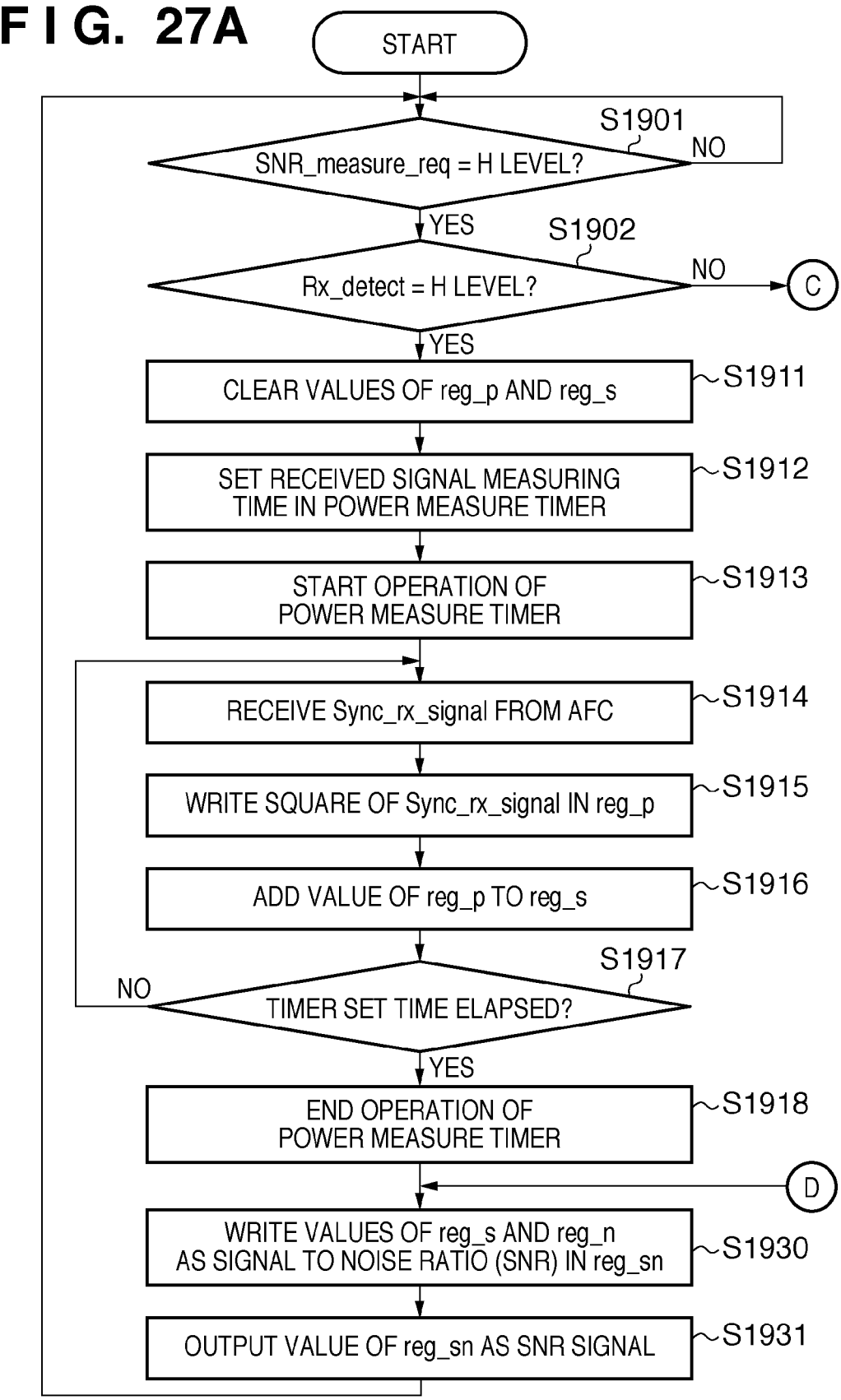
FIGS. 27A and 27B are a flowchart illustrating an example of the operation of a PGC 5110 according to the fifth embodiment.
Figure 27B:
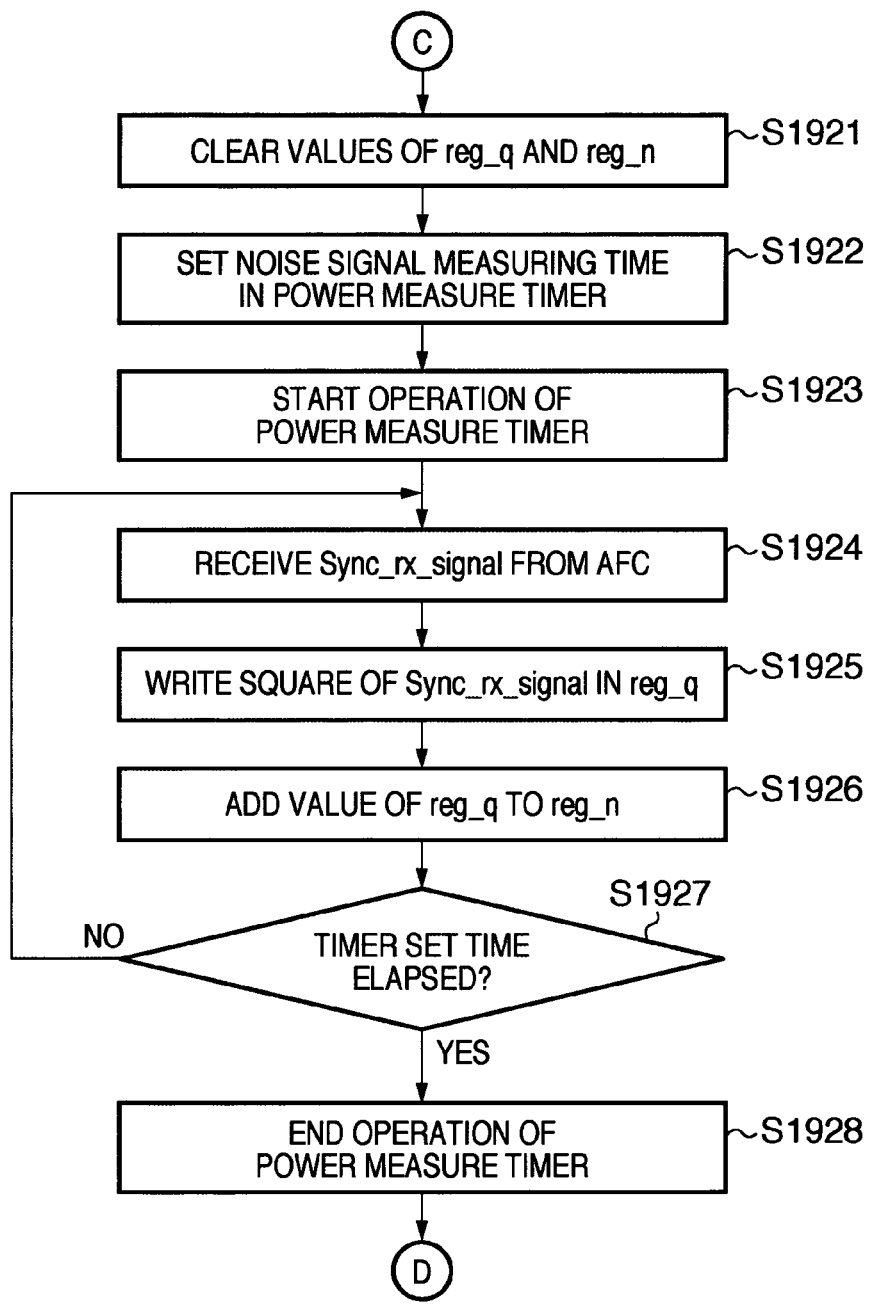

FIGS. 27A and 27B are a flowchart illustrating an example of the operation of the PGC 5110 according to the fifth embodiment. An operation of measuring an SNR will be explained here.

The PGC 5110 waits until the MAC 210 inputs the SNR_measure_req signal (NO in step S1901). Upon receiving the SNR_measure_req signal of H level (YES in step S1901), the PGC 5110 determines the input level of an Rx_detect signal (S1902).

Upon determining as a result that the Rx_detect signal is at H level (YES in step S1902), the PGC 5110 advances to step S1911 to measure signal power. Steps S1911 to S1918 correspond to a signal power measuring step when a received signal has been input.

When signal power measuring starts, the PGC 5110 clears the values of a reg_p 512 and the reg_s 522 (S1911). The PGC 5110 sets a received signal measuring time in the power measure timer 524 (S1912) and starts the operation of the power measure timer 524 (S1913).

The PGC 5110 receives the Sync_rx_signal signal that is a signal output from an AFC 501 (S1914), writes its square value in the reg_p 512 (S1915), and adds the value of the reg_p 512 to the reg_s 522 (S1916). During the timer set time, the processes in steps S1914 to S1916 are repeatedly executed (NO in step S1917). When the timer set time has elapsed (YES in step S1917), the PGC 5110 ends the operation of the power measure timer 524 (S1918).

If the Rx_detect signal is at L level (NO in step S1902), the PGC 5110 measures noise power. Steps S1921 to S1928 correspond to a noise power measuring step.

When noise power measuring starts, the PGC 5110 clears the values of a reg_q 513 and the reg_n 521 (S1921). The PGC 5110 sets a noise signal measuring time in the power measure timer 524 (S1922) and starts the operation of the power measure timer 524 (S1923).

The PGC 5110 receives the Sync_rx_signal signal that is a signal output from the AFC 501 (S1924), writes its square value in the reg_q 513 (S1925), and adds the value of the reg_q 513 to the reg_n 521 (S1926). During the timer set time, the processes in steps S1924 to S1926 are repeatedly executed (NO in step S1927). When the timer set time has elapsed (YES in step S1927), the PGC 5110 ends the operation of the power measure timer 524 (S1928).

After that, the PGC 5110 writes the signal to noise ratio (SNR) in the reg_sn 523 using the values stored in the reg_s 522 and the reg_n 521 (S1930), and outputs the value of the reg_sn 523 as the SNR signal (S1931).

An example of the operation of the RC 7000 according to the fifth embodiment will be described next with reference to FIG. 28. An operation of measuring an SNR will be explained here.

The RC 7000 determines whether the SNR_request signal of H level is input. The SNR_request signal is output from a CPU 110 to request SNR measuring. If the SNR_request signal is at H level (YES is step S2001), the RC 7000 outputs the SNR_measure_req signal of H level (S2002).

The RC 7000 sets an SNR measuring time in the SNR measure timer 712 (S2003) and starts the operation of the SNR measure timer 712 (S2004). The RC 7000 writes, in the reg_sn_rc 711, the SNR value that is a signal output from the BBP 220 (S2005). During the timer set time, the process in step S2005 is repeatedly executed (NO in step S2006). When the timer set time has elapsed (YES in step S2006), the RC 7000 ends the operation of the SNR measure timer 712 (S2007).

An example of the operation of the CPU 110 according to the fifth embodiment will be described next with reference to FIG. 29.

First, the CPU 110 determines whether the mode is the transmission mode. If the mode is the transmission mode (YES in step S2101), the CPU 110 inputs the SNR_request signal of H level to the RC 7000 (S2102). The CPU 110 then reads out, as the SNR, the value of the internal register reg_sn_rc 711 of the RC 7000 (S2103).

The CPU 110 compares the referred SNR value with an SNR threshold SNR_th. Upon determining as a result that the SNR is not more than SNR_th (NO in step S2104), the CPU 110 advances to step S2109 without re-encoding the decoded data. In step S2109, the CPU 110 outputs the Sync_rx_signal_request signal of H level to the RC 7000. This aims at resending the Sync_rx_signal signal (demodulated signal) stored in an Rx signal memory 405. The process then returns to step S2101.

If the SNR is more than SNR_th in step S2104 (YES in step S2104), the CPU 110 refers to the read address of a RAM 120 which stores the decoded data (S2105). The CPU 110 determines whether an INPUT_FIFO_rdy signal of H level is output. This process is executed to determine whether an INPUT FIFO 750 is write-accessible.

Upon determining as a result that the INPUT_FIFO_rdy signal is not at H level (NO in step S2106), the CPU 110 waits until the signal changes to H level. If the signal is at H level (YES in step S2106), the CPU 110 reads out the decoded data from the RAM 120 (S2107) and writes it in the INPUT FIFO 750 (S2108). The process ten returns to step S2101 again.

If the mode is not the transmission mode in step S2101 (NO in step S2101), the CPU 110 performs the operation for reception. In the reception, the CPU 110 first refers to the write address of the RAM 120 to temporarily store the decoded data (S2111). Next, the CPU 110 determines whether an OUTPUT_FIFO_rdy signal of H level is output. This process is executed to determine whether an OUTPUT FIFO 740 is read-accessible. If the OUTPUT_FIFO_rdy signal is not at H level (NO in step S2112), the CPU 110 waits until the signal changes to H level. If the signal is at H level (YES in step S2112), the CPU 110 outputs an OUTPUT_FIFO_oe signal of H level (S2113). The CPU 110 thus reads out the decoded data from the OUTPUT FIFO 740 and writes the readout decoded data in the RAM 120 (S2114). The process then returns to step S2101 again.

An example of the chart of a message sequence upon SNR measuring by a communication apparatus 100 according to the fifth embodiment will be described next with reference to FIG. 30.

The CPU 110 outputs the SNR_req signal of H level (S2201). The MAC 210 outputs the SNR_measure_req signal of H level (S2211). When an RF 230 outputs the Rx_detect signal of L level to the BBP 220 (S2241), the BBP 220 causes the PGC 5110 to measure noise power (S2231).

An antenna 240 receives an Rx_in signal that is a received signal on the radio channel, and transmits the signal to the RF 230 (S2251). The RF 230 outputs an RF_bb_out signal (S2242) and also outputs the Rx_detect signal of H level (S2243).

The BBP 220 causes the PGC 5110 to measure signal power (S2261), calculates the SNR (S2262), and outputs the SNR value as the SNR signal (S2263). The MAC 210 notifies the CPU 110 of the SNR value (S2271). This notification is done by outputting the SNR value stored in the internal register reg_sn_rc 711 of the RC 7000 as the SNR_resp signal.

Figure 31B:
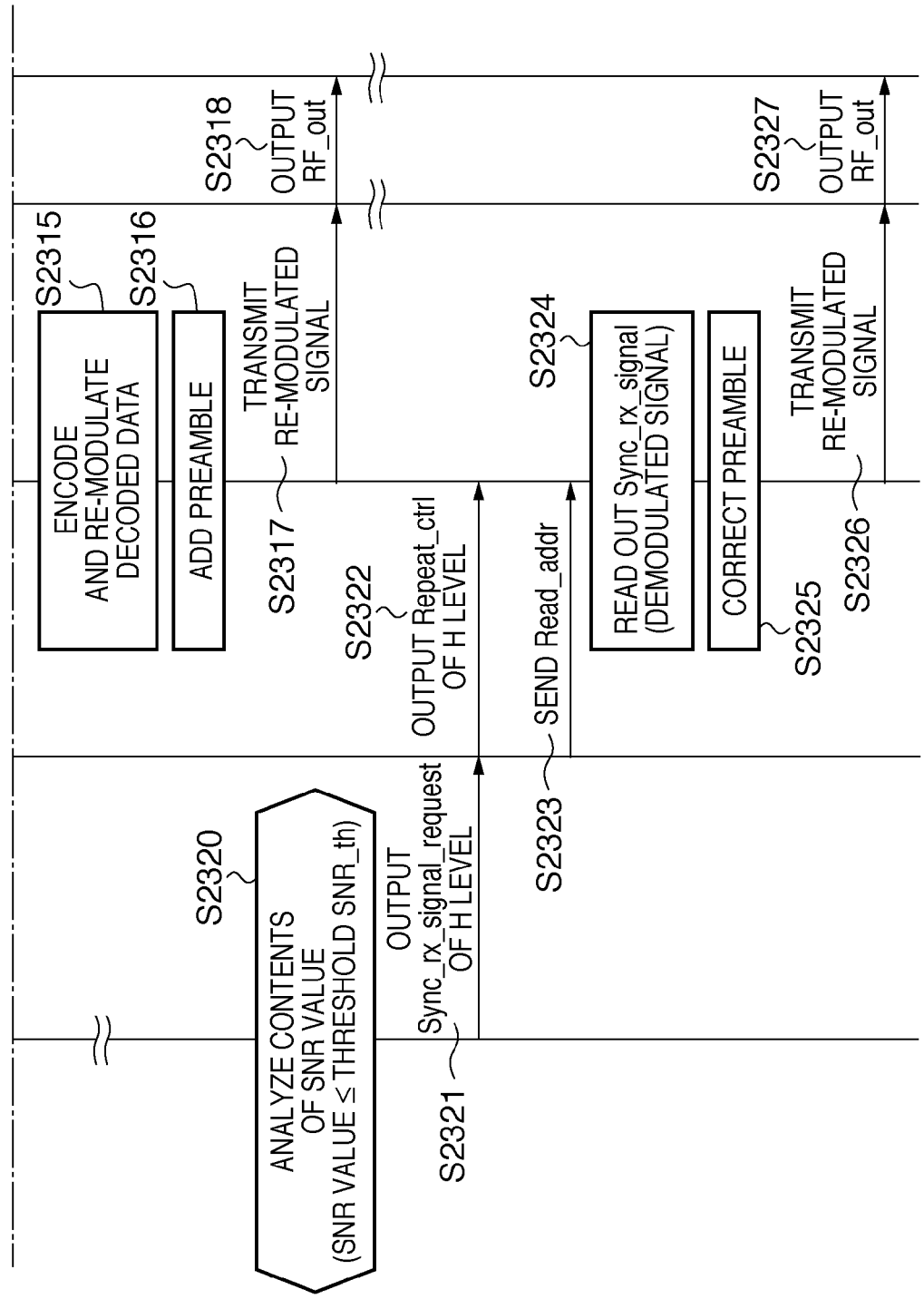
Figure 32A:
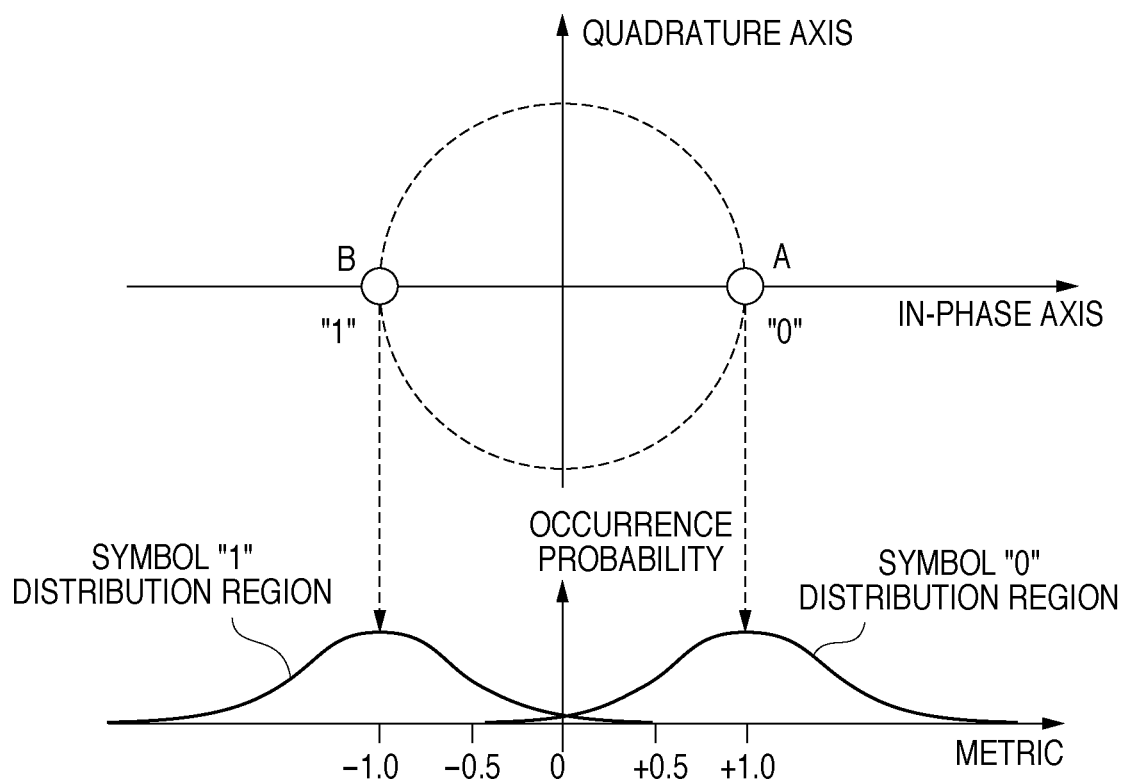
FIGS. 32A and 32B are views showing an example of a conventional technique.
Figure 32B:
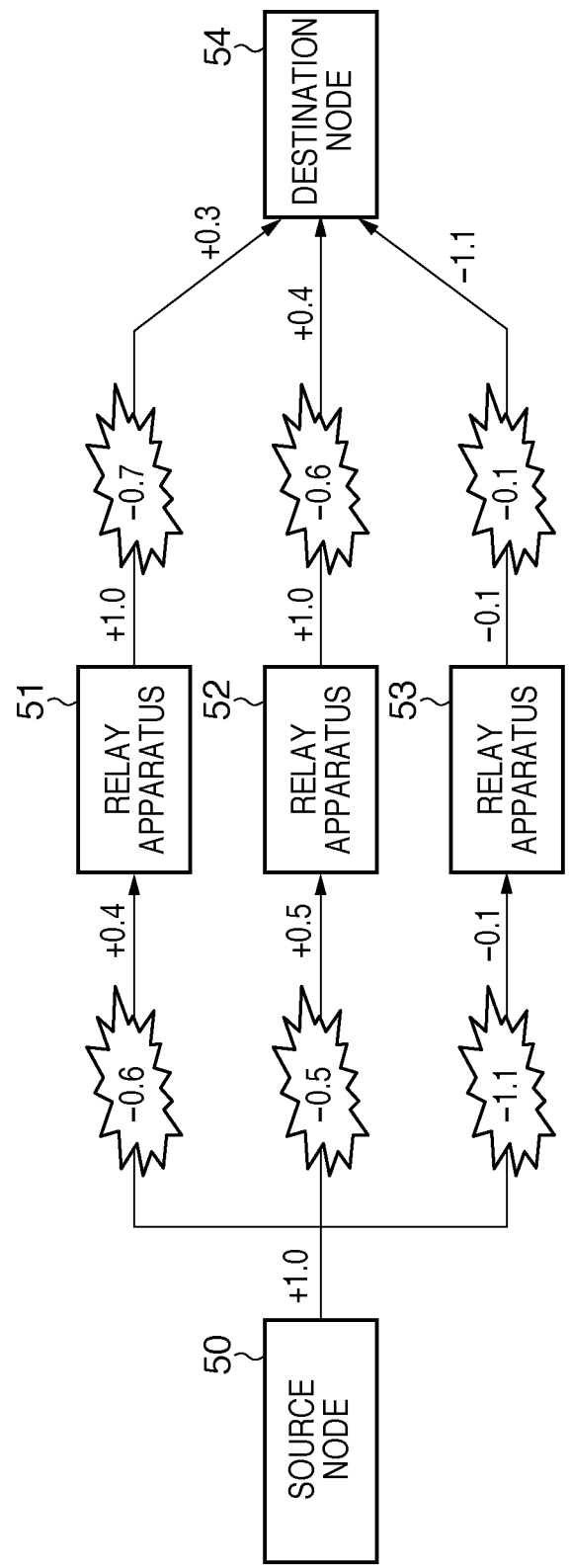

An example of the chart of a message sequence upon transmission by the communication apparatus 100 according to the fifth embodiment will be described next with reference to FIGS. 31A and 31B. Note that the chart of a message sequence upon reception is the same as in FIG. 23 which explains the fourth embodiment, and a description thereof will not be repeated.

The CPU 110 obtains the SNR value by the processing described with reference to FIG. 30 (S2300). The CPU 110 sets the entire communication apparatus 100 in the transmission mode (Tx mode) (S2301), and outputs a Tx_mode signal of H level to the MAC 210 (S2302). Upon receiving the Tx_mode signal, the MAC 210 outputs a TX_ON signal of H level to the BBP 220 and the RF 230 (S2303).

The CPU 110 analyzes the SNR value and switches the subsequent processing. A case in which noise power is low (the SNR value is more than the threshold SNR_th) will be explained first (S2310). In this case, the MAC 210 outputs the INPUT_FIFO_rdy signal of H level to the CPU 110 (S2311). The MAC 210 thus notifies the CPU 110 that the INPUT FIFO 750 is write-accessible.

The CPU 110 outputs the decoded data to the MAC 210 (S2312). The MAC 210 adds a CRC to the decoded data (S2313) and transfers it to the BBP 220 (S2314). The BBP 220 causes an Encoder 410 to re-encode the decoded data (unencoded PSDU) and also causes an OFDM mod 411 to re-modulate the data (S2315). Then, the BBP 220 causes a Preamble inserter 602 to add a Preamble to the re-modulated signal (S2316). When the re-modulated signal has been generated in this way, the BBP 220 causes a DAC 413 to convert the BB_RF_OUT (re-modulated signal) into an analog modulated signal and output it to the RF 230 (S2317). The RF 230 outputs an RF_out signal to the antenna 240, thereby transmitting the data onto the radio channel (S2318).

A case in which the SNR value is not more than the threshold SNR_th will be explained next (S2320). That is, this processing is executed when the CPU 110 has determined by analyzing the SNR value that the noise power is high.

The CPU 110 first outputs the Sync_rx_signal_request signal of H level to the MAC 210 (S2321). The MAC 210 outputs a Repeat_ctrl signal of H level to the BBP 220 (S2322). The MAC 210 also notifies the BBP 220 of a Read_addr value that is the read address start value of the Rx signal memory 405 (S2323). The BBP 220 reads out the Sync_rx_signal signal (S2324). The BBP 220 causes a multiplier 406 to multiply the Preamble portion of the Sync_rx_signal signal by a Preamble_compensation signal. The signal strength of the Preamble portion of the Sync_rx_signal signal is thus corrected (S2325). After that, The BBP 220 causes the DAC 413 to convert the corrected Sync_rx_signal signal (re-modulated signal) into an analog modulated signal and output it to the RF 230 (S2326). The RF 230 outputs the RF_out signal to the antenna 240, thereby transmitting the data onto the radio channel (S2327).

Typical embodiments of the present invention have been described above. However, the present invention is not limited to the aforementioned and illustrated embodiments, and can be properly modified without departing from the scope of the invention.

The present invention can adopt embodiments in the forms of, for example, a system, apparatus, method, program, and storage medium. The present invention may be applied to either a system constituted by a plurality of devices, or an apparatus consisting of a single device.

According to the present invention, it is possible to lower the error occurrence probability in relay data. According to the present invention, it is also possible to raise the relay data reconstruction probability. This enables to, for example, increase the channel capacity in a network.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus, comprising:
a demodulation unit configured to demodulate a received signal;
a waveform memory unit configured to store a waveform of the demodulated signal;
a decoding unit configured to decode the demodulated signal;
an encoding unit configured to encode the decoded signal;
a relay data selection unit configured to select one of the encoded signal encoded by the encoding unit and the waveform of the demodulated signal stored in the waveform memory unit, according to a reception state of the received signal;
a modulation unit configured to modulate the selected one of the encoded signal via the encoding unit and modulate the waveform of the demodulated signal stored in the waveform memory unit; and
a transmission unit configured to transmit the selected one of the modulated encoded signal, which is obtained by modulating the encoded signal, and the modulated demodulated signal, which is obtained by modulating the demodulated signal stored in the waveform memory unit.

2. The communication apparatus according to claim 1, wherein, in a case where the modulation unit modulates the encoded signal, a communication control signal is newly added to the modulated encoded signal, and, in a case where the modulation unit modulates the demodulated signal stored in the waveform memory unit, a communication control signal contained in the demodulated signal is corrected.

3. The communication apparatus according to claim 1, further comprising:
an error detection unit configured to detect an error of the decoded signal,
wherein, if an amount of errors detected from the decoded signal is more than a predetermined error threshold, the modulation unit modulates the demodulated signal stored in the waveform memory unit.

4. The communication apparatus according to claim 3, wherein, if the amount of errors detected from the decoded signal is not more than the predetermined error threshold, the modulation unit modulates the encoded signal.

5. The communication apparatus according to claim 1, wherein
the decoding unit decodes the demodulated signal using an error correction code,
if the received signal contains errors in number beyond a correction capability of the error correction code, the modulation unit modulates the demodulated signal stored in the waveform memory unit, and
if the received signal does not contain errors in number beyond the correction capability of the error correction code, the modulation unit modulates the encoded signal.

6. The communication apparatus according to claim 1, further comprising:

a detection unit configured to detect an error contained in the decoded signal by verifying a checksum added to the decoded signal, wherein, if the detection unit has detected the error, the modulation unit modulates the demodulated signal stored in the waveform memory unit, and if the detection unit has not detected the error, the modulation unit modulates the encoded signal.

7. The communication apparatus according to claim 1, further comprising:

a measuring unit configured to measure a ratio of noise to the received signal, wherein, if the ratio of noise measured by the measuring unit is more than a predetermined threshold, the modulation unit modulates the demodulated signal stored in the waveform memory unit by the demodulation unit.

8. The communication apparatus according to claim 7, wherein, if the ratio of noise detected from the received signal is not more than the predetermined threshold, the modulation unit modulates the encoded signal.

9. The communication apparatus according to claim 1, further comprising:

an estimation unit configured to compare a threshold serving as a determination criterion to be used to determine whether the received signal contains errors beyond a correction capability of an error correction code with a result obtained by estimating a signal to noise ratio of a wireless signal, wherein, if the estimated signal to noise ratio is more than the threshold, the modulation unit modulates the demodulated signal stored in the waveform memory unit, and if the estimated signal to noise ratio is not more than the threshold, the modulation unit modulates the encoded signal.

10. A relay method for a communication apparatus, the relay method comprising:

demodulating a received signal;

storing a waveform of the demodulated signal in a memory;

decoding the demodulated signal;

encoding the decoded signal;

selecting one of the demodulated signal and the waveform of the demodulated signal, according to a reception state of the received signal;

modulating the selected on of the encoded and the waveform of the demodulated signal stored in the memory; and transmitting the selected one of the modulated encoded signal, which is obtained by modulating the encoded signal, and the modulated demodulated signal, which is obtained by modulating the demodulated signal stored in the memory.

11. A non-transitory computer-readable storage medium storing a computer program for causing a computer to function as:

a demodulation unit configured to demodulate a received signal;

a waveform memory unit configured to store a waveform of the demodulated signal;

a decoding unit configured to decode the demodulated signal;

an encoding unit configured to encode the decoded signal;

a relay data selection unit configured to select one of the demodulated signal and the waveform of the demodulated signal stored in the waveform memory unit, according to a reception state of the received signal;

a modulation unit configured to modulate one of the encoded signal via the encoding unit and modulate the waveform of the demodulated signal stored in the waveform memory-unit selected by the relay data selection unit; and a transmission unit configured to transmit the selected one of the modulated encoded signal, which is obtained by modulating the encoded signal, and the modulated demodulated signal, which is obtained by modulating the demodulated signal stored in the waveform memory unit.

12. A non-transitory computer-readable medium storing a program causing a communication apparatus to perform a relay method for a communication apparatus, the method comprising:

demodulating a received signal;

storing a waveform of the demodulated signal in a memory;

decoding the demodulated signal;

encoding the decoded signal;

selecting one of the encoded signal and the waveform of the demodulated signal stored in the memory, according to a reception state of the received signal;

modulating the selected one of the encoded signal and the waveform of the demodulated signal stored in the memory; and transmitting the selected one of the modulated encoded signal, which is obtained by modulating the encoded signal, and the modulated signal, which is obtained by modulating the demodulated signal stored in the memory.

* * * * *